United States Patent [19]
Hashimoto et al.

[11] Patent Number: 4,884,866
[45] Date of Patent: Dec. 5, 1989

[54] FLUORINE-CONTAINING RESIN COMPOSITION HAVING LOW REFRACTIVE INDEX

[75] Inventors: Yutaka Hashimoto; Masayuki Kamei, both of Sakai; Toshihiko Umaba, Takaishi, all of Japan

[73] Assignee: Dainippon Ink and Chemicals, Inc., Tokyo, Japan

[21] Appl. No.: 236,736

[22] Filed: Aug. 26, 1988

Related U.S. Application Data

[62] Division of Ser. No. 18,398, Feb. 25, 1987, Pat. No. 4,786,658.

[30] Foreign Application Priority Data

Feb. 27, 1986 [JP] Japan .................................. 61-40383
Apr. 24, 1986 [JP] Japan .................................. 61-93226

[51] Int. Cl.$^4$ .............................................. G02B 6/02
[52] U.S. Cl. ............................. 350/96.34; 350/96.29; 350/96.30; 427/163; 525/289
[58] Field of Search ............... 350/96.29, 96.30, 96.34; 427/163; 525/276, 289; 522/121

[56] References Cited

U.S. PATENT DOCUMENTS 4,511,209  4/1985  Skutnik ........................... 350/96.34
4,564,263  1/1986  Ueba ............................... 350/96.34

Primary Examiner—John C. Bleutge
Assistant Examiner—David Buttner
Attorney, Agent, or Firm—Sherman and Shalloway

[57] ABSTRACT

An active energy ray-curable resin composition which gives a cured product having a refractive index of not more than 1.44 comprises (I) a fluorine-containing polymer composed of (A) and at least one of (B) and (C): (A) a fluorine-containing (meth)acrylate, (B) an alpha,beta-ethylenically unsaturated dicarboxylic acid ester and (C) a mono(meth)acrylate and having a fluorine atom content of at least 30% by weight, (II) a fluorine-containing (meth)acrylate, (III) a mono(meth)acrylate and (IV) a polyfunctional monomer containing at least two (meth)acryloyl groups in the molecule. Optical fibers are produced by coating the above composition on a core material and irradiating active energy rays onto the coating to form a cured cladding of the composition.

13 Claims, No Drawings

FLUORINE-CONTAINING RESIN COMPOSITION HAVING LOW REFRACTIVE INDEX

This is a division of application Ser. No. 018,398, filed Feb. 25, 1987, now Pat. No. 4,786,658.

This invention relates to a resin composition curable by irradiation of active energy rays such as electron beams or ultraviolet light. More specifically, this invention pertains to an active energy ray-curable resin composition which gives a tough and transparent cured resin having a low refractive index when exposed to irradiation of active energy rays, and to a method of forming optical fibers using the resin composition.

Fluorine-containing polymers have been utilized as a highly functional material in various fields because of their generally high chemical resistance, weather-ability, water repellence, oil repellence and surface smoothness. In recent years, their low refractive index has attracted attention, and they have come into active use as a cladding material for optical fibers or a low-refractive coating material.

An optical fiber is produced from an inorganic glass or a synthetic resin, and consists of a core portion having excellent transparency and a high refractive index and a clad portion having a relatively low refractive index.

As the clad portion, coatings or claddings of silicone compounds or fluorine-containing polymers having a low refractive index have been proposed and come into commercial acceptance. Some examples of forming such a clad portion are given below.

(1) A method which comprises coating a drawn quartz core fiber with a silicone resin composition, and thermally curing the coating to form a clad portion of the silicone resin on the core.

(2) A method which comprises composite-spinning a poly(methyl methacrylate) or polystyrene as a core material and a fluorine-containing polymer such as a polymer of a fluorinated alkyl-containing (meth)acrylate, a copolymer of a fluorinated alkyl-containing (meth)acrylate and a comonomer, polytetrafluoroethylene, poly(vinylidene fluoride/tetrafluoroethylene) or poly(vinylidene fluoride/hexafluoropropylene) obtained by such a polymerization method as solution polymerization, bulk polymerization or emulsion polymerization to form an optical fiber having a clad portion composed of the fluorine-containing polymer on the core (for example, Japanese patent publication No. 8978/1968).

(3) A method which comprises coating a melt or solution of a fluorine-containing polymer such as poly(vinylidene fluoride/tetrafluoroethylene) on a core of quartz or a plastic molded in fiber form, thereby to form a clad portion of the fluorine-containing polymer on the core (for example, U.S. Pat. No. 3,930,103).

The silicone resin used in method (1) above has excellent heat resistance but inferior mechanical strength and oil resistance. In particular, it has the defect that when immersed in mineral oils, it swells and changes in refractive index or peels off from the core. Hence, optical fibers having the silicone resin as a clad are limited in use, and are unsuitable for use in transformers, thyristors or the like or in oils. The method (1) also has the operational defect that since the silicone resin composition before curing has a short pot life and increases in viscosity with time, the coating speed or the temperature of the working environment must be controlled in order to coat it in a fixed film thickness on the core. Furthermore, because the lowest possible refractive index of silicone resins is about 1.40, they have insufficient performance as a clad of large-diameter optical fibers which are required with an increase in the capacity of communications.

The fluorine-containing polymers used in methods (2) and (3) are more suitable than the silicone resins as a clad of large-diameter optical fibers because of their refractive indices are as low as about 1.36. However, since the conventional methods of forming a clad portion from fluorine-containing polymers as shown in (2) and (3) involves composite-spinning of the core and the sheath at high temperatures or coating of a melt or solution of the fluorine-containing polymer on a core molded in fiber form, the diameter of the core or the thickness of the clad portion tends to become nonuniform. Light scattering occurs at local bent portions which are consequently formed in the interface between the core and the clad, and then transmission losses increase. Moreover, optical fibers formed by these prior methods do not always have sufficient adhesion between the core and the clad, and are liable to undergo delamination owing to various external factors such as bending, pressure change and temperature change. Their durability, therefore, is not satisfactory. Furthermore, in the method of producing optical fibers by coating a melt or solution of such a fluorine-containing polymer as shown in methods (2) and (3), curing of the clad portion is time-consuming. In the case of coating the solution, the manufacturing process and facilities become complex because of the need for removing the solvent completely out of the system. Hence, this method lacks productivity, safety and economy.

With this background, U.S. Pat. No. 4,511,209 recently proposed a method of forming optical fibers in which as a result of noting rapid curing of an acrylate monomer by photopolymerization, an ultraviolet-curable resin comprising a highly fluorinated monoacrylate and a trifunctional or higher acrylate monomer as a crosslinking agent is used as a cladding component. The present inventors have found, however, that an ultraviolet-curable compositon composed only of the monomer components as shown in this U.S. Patent has too low a viscosity, and cannot be coated on cores by the existing production methods using a coat die. Furthermore, when such a composition is coated on the core by a spraying method, cratering occurs on the core because of the low viscosity of the composition, and no satisfactory optical fibers can be formed. Furthermore, since the cured resin obtained after ultraviolet radiation of the composition has poor transparency, the resulting optical fibers have large transmission losses.

As stated above, no cladding material of a low refractive index has yet been found which proves to be satisfactory in properties such as mechanical strength, adhesion and transparency as well as in productivity, safety and economy in the production of optical fibers and adaptability to the existing coating methods, and which permits production of optical fibers having a large numerical aperture and a large diameter.

The present inventors have made extensive investigations in order to solve the aforesaid problems of the prior art. These investigations have now led to the discovery that an active energy ray-cured product of a resin compositon comprising a certain fluorine-containing polymer, a certain fluorine-containing (meth)acrylate and a (meth)acrylate monomer containing no fluorine is outstandingly superior to the conventional cladding materials for optical fibers in regard to properties such as mechanical strength, adhesion and transparency, productivity, safety and economy in the production of optical fibers, adaptability to the existing coating methods, and to wetting property and levelling property on cores of optical fibers during spray coating.

It should be understood that the expression "(meth)acrylate", used throughout the present specification, means "an acrylate, a methacrylate or both".

The present inventors have also found that a resin composition having a viscosity suited for the coating equipment and the required coating thickness on the core can be easily prepared since its viscosity can be controlled freely by adjusting the degree of polymerization and/or the content of the fluorine-containing polymer in the composition, and that by increasing the fluorine atom content of the fluorine-containing polymer there can be obtained a cladding material having a refractive index of about 1.36 which permits production of optical fibers having a larger numerical aperture and a larger diameter.

Thus, according to this invention, there are provided an active energy ray-curable resin composition which gives a cured product having a refractive index of not more than 1.44, said composition comprising (I) a fluorine-containing polymer composed of (A) a fluorine-containing (meth)acrylate, and at least one of (B) an alpha,beta-ethylenically unsaturated dicarboxylic acid ester and (C) a mono(meth)acrylate and having a fluorine atom content of at least 30% by weight, (II) a fluorine-containing (meth)acrylate, (III) a mono(meth)acrylate and (IV) a polyfunctional monomer containing at least two (meth)acryloyl groups in the molecule; and a method of forming optical fibers, which comprises coating the active energy ray-curable resin composition on an optical fiber core and irradiating active energy rays onto the coating to cure it.

The fluorine-containing polymer (I) is essential in order to impart to the resin composition of the invention such a viscosity and a levelling property as to permit coating of the composition on an optical fiber core. If the composition lacks the fluorine-containing polymer (I), the composition is extremely difficult to coat and the resulting optical fiber has a poor quality. The fluorine atom content of at least 30% in the fluorine-containing polymer (I) is also essential in order to secure compatibility of the polymer with the fluorine-containing (meth)acrylate (II), the mono(meth)acrylate (III) and the polyfunctional monomer (IV) containing at least two (meth)acryloyl groups in the molecule and to increase the transparency of the product (i.e., sheath material) obtained by irradiating active energy rays onto the resin composition of the invention. The use of the alpha,beta-ethylenically unsaturated dicarboxylic acid ester (B) and/or the mono(meth)acrylate (C) as components of the fluorine-containing polymer (I) is very important in increasing the transparency of the fluorine-containing polymer (I), the compatibility of the polymer with the fluorine-containing (meth)acrylate (II), the mono(meth)acrylate (III) and the polyfunctional monomer (IV), the adhesion of the resulting sheath to a quartz or plastic core, and also the transparency and flexibility of the cured resin (i.e., sheath) obtained by irradiating active energy rays on the resin composition of this invention. If the fluorine-containing polymer (I) lacks the ethylenically unsaturated dicarboxylic acid ester (B) and/or the mono(meth)acrylate (C), the transparency, compatibility and adhesion of the fluorine-containing polymer (I) and the transparency of the cured resin are reduced. There is no particular limitation on the proportion of the dicarboxylic acid ester (B) and/or the mono(meth)acrylate (C) to be copolymerized if the fluorine atom content of the fluorine-containing polymer (I) does not fall below 30% by weight. Preferably, it is 0.5 to 50% by weight. There is no particular limitation either on the molecular weight of the fluorine-containing polymer (I). In order to give the resin composition of the invention such a viscosity and a levelling property as to permit coating of the composition on an optical fiber core, the polymer (I) has a number average molecular weight, $\overline{\mathrm{Mn}}$, of 1,000 to 2,000,000. When the polymer (I) is obtained by bulk polymerization, its viscosity is preferably 1,000 to 500,000 cps at 25° C.

The fluorine-containing (meth)acrylate (A) as a component of the fluorine-containing polymer (I) and the fluorine-containing (meth)acrylate (II) as a component of the resin composition of this invention results from bonding of a perfluoroalkyl group or partially fluorinated aliphatic group having 1 to 20 carbon atoms to a (meth)acryloyl group via divalent group. Examples include compounds represented by the general formula

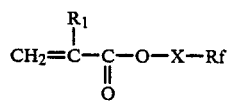

wherein Rf represents a perfluoroalkyl group or partially fluorinated aliphatic group having 1 to 20 carbon atoms optionally containing an oxygen atom in the main chain, for example

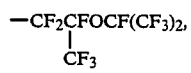

$R_1$ is H, $CH_3$, Cl or F, X is a divalent bridging group such as

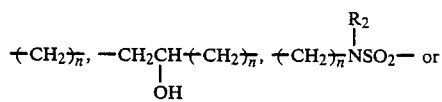

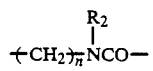

in which n is an integer of 1 to 10, and $R_2$ is H or an alkyl group having 1 to 6 carbon atoms,

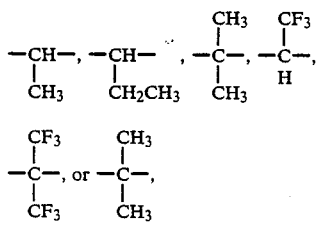

and compounds having a plurality of perfluoroalkyl groups in the molecule such as compounds represented by the following general formula $$CH_2=\underset{CH_2CH_2C_lF_{2l+1}}{\overset{|}{C}}-COOCH_2CH_2C_lF_{2l+1}$$

wherein l is an integer of 1 to 14.

Specific examples of the compound (A) or (II) are as follows.

a-1: $CH_2=CHCOOCH_2CH_2C_8F_{17}$ a-2: $CH_2=\underset{}{\overset{CH_3}{\overset{|}{C}}}COOCH_2CH_2C_8F_{17}$ a-3: $CH_2=CHCOOCH_2CH_2C_{12}F_{25}$ a-4: $CH_2=\overset{CH_3}{\underset{|}{C}}COOCH_2CH_2C_{12}F_{25}$ a-5: $CH_2=CHCOOCH_2CH_2C_{10}F_{21}$ a-6: $CH_2=\overset{CH_3}{\underset{|}{C}}COOCH_2CH_2C_{10}F_{21}$ a-7: $CH_2=CHCOOCH_2CH_2C_6F_{13}$ a-8: $CH_2=\overset{CH_3}{\underset{|}{C}}COOCH_2CH_2C_6F_{13}$ a-9: $CH_2=CHCOOCH_2CH_2C_4F_9$ a-10: $CH_2=\overset{F}{\underset{|}{C}}COOCH_2CH_2C_6F_{13}$ a-11: $CH_2=\overset{CH_3}{\underset{|}{C}}COOCH_2CH_2C_{20}F_{41}$ a-12: $CH_2=\overset{Cl}{\underset{|}{C}}COOCH_2CH_2C_4F_9$ a-13: $CH_2=\overset{CH_3}{\underset{|}{C}}COO(CH_2)_6C_{10}F_{21}$ a-14: $CH_2=\overset{CH_3}{\underset{|}{C}}COOCH_2CF_3$ a-15: $CH_2=CHCOOCH_2CF_3$ a-16: $CH_2=CHCOOCH_2C_8F_{17}$ a-17: $CH_2=\overset{CH_3}{\underset{|}{C}}COOCH_2C_8F_{17}$ a-18: $CH_2=\overset{CH_3}{\underset{|}{C}}COOCH_2C_{20}F_{41}$ a-19: $CH_2=CHCOOCH_2C_{20}F_{41}$ a-20: $CH_2=\overset{CH_3}{\underset{|}{C}}COOCH_2CF(CF_3)_2$ a-21: $CH_2=\overset{CH_3}{\underset{|}{C}}COOCH_2CFHCF_3$ a-22: $CH_2=\overset{F}{\underset{|}{C}}COOCH_2C_2F_5$ -continued a-23: $CH_2=CHCOOCH_2(CF_2)_6CF(CF_3)_2$ a-24: $CH_2=\underset{CH_3}{\overset{CH_3}{\overset{|}{\underset{|}{C}}}}COOCHCF_2CFHCF_3$ a-25: $CH_2=\underset{C_2H_5}{\overset{CH_3}{\overset{|}{\underset{|}{C}}}}COOCHC_{10}F_{21}$ a-26: $CH_2=CHCOOCH_2(CF_2)_2H$ a-27: $CH_2=\overset{CH_3}{\underset{|}{C}}COOCH_2(CF_2)_2H$ a-28: $CH_2=CHCOOCH_2(CF_2)_4H$ a-29: $CH_2=CHCOOCH_2CF_3$ a-30: $CH_2=\overset{CH_3}{\underset{|}{C}}COO(CF_2)_4H$ a-31: $CH_2=CHCOOCH_2(CF_2)_6H$ a-32: $CH_2=\overset{CH_3}{\underset{|}{C}}COOCH_2(CF_2)_6H$ a-33: $CH_2=CHCOOCH_2(CF_2)_8H$ a-34: $CH_2=\overset{CH_3}{\underset{|}{C}}COOCH_2(CF_2)_8H$ a-35: $CH_2=CHCOOCH_2(CF_2)_{10}H$ a-36: $CH_2=CHCOOCH_2(CF_2)_{12}H$ a-37: $CH_2=CHCOOCH_2(CF_2)_{14}H$ a-38: $CH_2=CHCOOCH_2(CF_2)_{18}H$ a-39: $CH_2=CHCOO\underset{CH_3}{\overset{CH_3}{\overset{|}{\underset{|}{C}}}}(CF_2)_4H$ a-40: $CH_2=CHCOOCH_2CH_2(CF_2)_7H$ a-41: $CH_2=\overset{CH_3}{\underset{|}{C}}COOCH_2CH_2(CF_2)_7H$ a-42: $CH_2=\overset{CH_3}{\underset{|}{C}}COO-\underset{CF_3}{\overset{CF_3}{\overset{|}{\underset{|}{C}}}}(CH_2)_6H$ a-43: $CH_2=CHCOO-\underset{CF_3}{\overset{|}{C}H}C_8F_{17}$ a-44: $CH_2=CHCOOCH_2C_2F_5$ a-45: $CH_2=CHCOOCH_2\underset{OH}{\overset{|}{C}H}CH_2C_8F_{17}$ -continued a-46: $CH_2=\underset{\underset{OH}{|}}{\overset{\overset{CH_3}{|}}{C}}COOCH_2CH\text{-}(CH_2)_{\overline{4}}C_{18}F_{37}$ a-47: $CH_2=CHCOOCH_2CH_2\underset{\underset{C_3H_7}{|}}{N}SO_2C_8F_{17}$ a-48: $CH_2=\overset{\overset{CH_3}{|}}{C}COOCH_2CH_2\overset{\overset{CH_3}{|}}{N}SO_2C_6F_{13}$ a-49: $CH_2=\overset{\overset{Cl}{|}}{C}COO\text{-}(CH_2)_{\overline{6}}\overset{\overset{H}{|}}{N}SO_2C_{12}F_{25}$ a-50: $CH_2=CHCOOCH_2CH_2\underset{\underset{C_2H_5}{|}}{N}COC_7F_{15}$ a-51: $CH_2=CHCOO\text{-}(CH_2)_{\overline{8}}\overset{\overset{CH_3}{|}}{N}COC_{12}F_{25}$ a-52: $CH_2=\underset{\underset{CH_2CH_2C_8F_{17}}{|}}{C}-COOCH_2CH_2C_8F_{17}$ Investigations of the present inventors have shown that the fluorine-containing (meth)acrylate (A) and the fluorine-containing (meth)acrylate (II) are preferably those in which the divalent bridging group X is —(CH$_2$)$_n$— where n is 0 or an integer of 1 to 6 from the standpoint of the transparency of the resin composition of the invention after irradiation of the active energy rays, namely its optical transparency as a clad of optical fibers. With other compounds, the transmission characteristics of optical fibers produced from the resulting resin compositions tend to be reduced slightly.

The fluorine-containing (meth)acrylate (A) and the fluorine-containing (meth)acrylate (II) may each be a mixture of two or more compounds having different structures. The fluorine-containing (meth)acrylate (A) may be the same as, or different from, the fluorine-containing (meth)acrylate (II). Needless to say, the present invention is not limited at all by the above-given specific examples of these compounds.

The alpha,beta-ethylenically unsaturated dicarboxylic acid ester (B) is represented by the general formula $$R_5OOC(R_3)C=C(R_4)COOR_6$$

wherein $R_3$ and $R_4$ are identical or different and each represents H, F, Cl or $CH_3$, $R_5$ and $R_6$ represent H, or an alkyl or fluoroalkyl group having 1 to 20 carbon atoms, and $R_5$ and $R_6$ are identical or different provided that if one of them is H, the other is other than H.

When $R_5$ and $R_6$ are alkyl groups, they preferably have 3 to 8 carbon atoms from the standpoint of the compatibility of the compound (B) with the fluorine-containing (meth)acrylate (II), the mono(meth)acrylate (III), and the polyfunctional monomer (IV), the transparency and amorphous nature of the fluorine-containing polymer (I), and the transparency of the cured resin obtained by irradiating the active energy rays onto the resin composition (cladding).

Specific examples of the alpha,beta-ethylenically unsaturated carboxylic acid ester (B) are given below.
b-1: diethyl fumarate
b-2: n-butyl fumarate
b-3: di-isobutyl fumarate
b-4: di-t-butyl fumarate
b-5: dipropyl fumarate
b-6: di-2-ethylhexyl fumarate
b-7: dihexyl fumarate
b-8: ethylbutyl fumarate
b-9: dibutyl maleate
b-10: dioleyl maleate
b-11: n-butyl t-butyl fumarate
b-12: ethyl isobutyl fumarate
b-13:

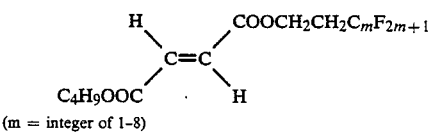

(m = integer of 1-8)

b-14:

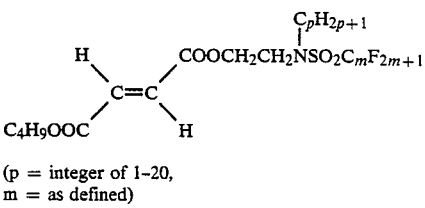

(p = integer of 1-20, m = as defined)

b-15:

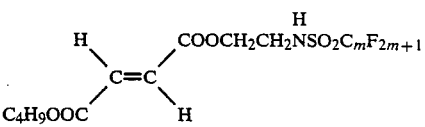

(m = as defined)

b-16:

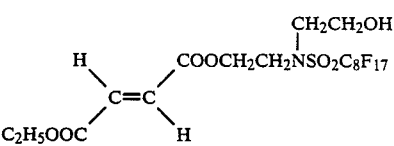

b-17:

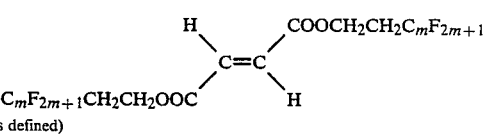

(m = as defined)

b-18:

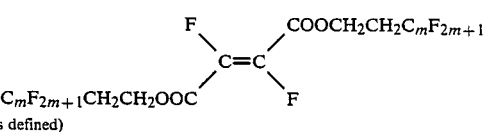

(m = as defined)

b-19:

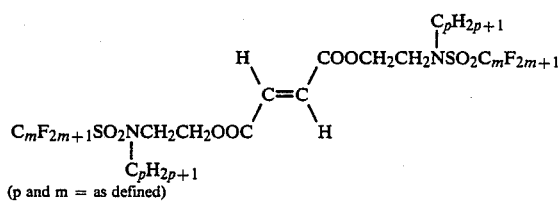
(p and m = as defined)

b-20:

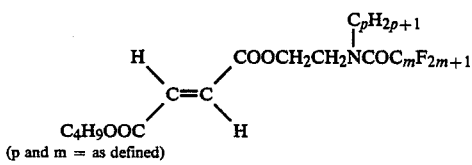
(p and m = as defined)

Needless to say, the present invention is in no way limited by these specific examples of the compound (B).

As stated above, the mono(meth)acrylate (C) as a constituent monomer of the fluorine-containing polymer (I) is important with regard to the transparency and compatibility of the fluorine-containing polymer (I), and the transparency of the cured resin obtained by irradiating active energy rays onto the resin composition of this invention. The mono(meth)acrylate (III) is also an essential component from the standpoint of the transparency of the cured resin and its adhesion to an optical fiber core. If the composition lacks the mono(meth)acrylate, the transparency and adhesion of the cured resin becomes poor.

The mono(meth)acrylate (C) and the mono(meth)acrylate (III) are compounds represented by the following general formula

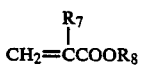

wherein $R_7$ is H or $CH_3$, and $R_8$ is a group having 1 to 20 carbon atoms. Specific examples include n-propyl (meth)acrylate, i-propyl (meth)acrylate, n-butyl (meth)acrylate, i-butyl (meth)acrylate, t-butyl (meth)acrylate, hexyl (meth)acrylate, octyl (meth)acrylate, decyl (meth)acrylate, isodecyl (meth)acrylate, lauryl (meth)acrylate, stearyl (meth)acrylate, isostearyl (meth)acrylate, glycerol (meth)acrylate, 2-hydroxypropyl (meth)acrylate, 3-chloro-2-hydroxypropyl (meth)acrylate, glycidyl (meth)acrylate, allyl (meth)acrylate, butoxyethyl (meth)acrylate, butoxyethylene glycol (meth)acrylate, N,N-diethylaminoethyl (meth)acrylate, N,N-dimethylaminoethyl (meth)acrylate, 2-ethylhexyl (meth)acrylate, gamma-methacryloxypropyltrimethoxysilane, 2-methoxyethyl (meth)acryalte, methoxydiethylene glycol (meth)acrylate, methoxydipropylene glycol (meth)acrylate, nonylphenoxypolyethylene glycol (meth)acrylate, nonylphenoxypolypropylene glycol (meth)acrylate, Aronix M-5700 (a product of Toa Gosei Co., Ltd.), phenoxyethyl (meth)acrylate, phenoxypropylene glycol (meth)acrylate, phenoxydipropylene glycol (meth)acrylate, phenoxypolypropylene glycol (meth)acrylate, phosphate group-containing (meth)acrylates such as AR-260, MR-260, AR-200, MR-204 and MR-208 (products of Daihachi Chemical Co., Ltd.), Viscoat 2000 and Viscoat 2308 (products of Osaka Yuki Sha), polybutadienee (meth)acrylate, polyethylene glycol (meth)acrylate, polypropylene glycol (meth)acrylate, polyethylene glycol polypropylene glycol (meth)acrylate, polyethylene glycol polybutylene glycol (meth)acrylate, polystyrylethyl (meth)acrylate, Light Ester HOA-MS and Light Ester HOMS (products of Kyoei Oils and Fats Co., Ltd.), benzyl (meth)acrylate, cyclohexyl (meth)acrylate, dicyclopentanyl (meth)acrylate, dicyclopentenyl (meth)acrylate, isobornyl (meth)acrylate, methoxylated cyclodecatriene (meth)acrylate, phenyl (meth)acrylate, and FA-512A (dicyclopentenyloxyethyl acrylate) and FA-512M (dicyclopentenyloxyethyl methacrylate) (products of Hitachi Chemical Co., Ltd.).

Needless to say, the present invention is in no way limited by these specific examples.

The mono(meth)acrylate (C) and the mono(meth)acrylate (III) may each be a mixture of two or more compounds. The mono(meth)acrylate (C) may be identical with, or different from, the mono(meth)acrylate (III).

Investigations of the present inventors have shown that preferred as the mono(meth)acrylate (C) and the mono(meth)acrylate (III) are those in which the substituent in the ester moiety has 3 to 12 carbon atoms because these compounds in small amounts increase the transparency and compatibility of the fluorine-containing polymer and the transparency of the cured resin and its adhesion to an optical fiber core. Especially preferred are those in which the substituent in the ester moiety has a cyclic structure, for example benzyl (meth)acrylate (c-1), cyclohexyl (meth)acrylate (c-2), dicyclopentanyl (meth)acrylate (c-3), dicyclopentenyl (meth)acrylate (c-4), isobornyl (meth)acrylate (c-5), methoxylated cyclodecalin (meth)acrylate (c-6), phenyl (meth)acrylate (c-7) and FA-512 (c-8) and FA-512M (c-9). Above all, dicyclopentanyl (meth)acrylate (c-3), dicyclopentenyl (meth)acrylate (c-4), and isobornyl (meth)acrylate (c-5) are preferred because they increase the adhesion of the cured resin to a quartz or plastic core of optical fibers.

From the standpoint of temperature stability with regard to the transparency of the cured resin (cladding), both dicyclopentenyl (meth)acrylate (c-4) and dicyclopentanyl (meth)acrylate (c-3), or both dicyclopentenyl (meth)acrylate (c-4 and isobornyl (meth)acrylate (c-5) are preferably included as the mono(meth)acrylate (C) and/or the mono(meth)acrylate (III).

In particular, dicyclopentanyl (meth)acrylate (c-3) is a very important component which imparts dynamic strength to optical fibers to permit connections through a connector only by caulking.

The polyfunctional monomer (IV) having at least two (meth)acrylate groups in the molecule results from bonding at least two (meth)acrylic acid moieties to a dihydric or higher alcohol by an ester linkage. It is an essential component of the resin composition of this invention in order to impart flexibility and dynamic toughness to the cured resin. Specific examples are given below.

d-1: ethylene glycol di(meth)acrylate
d-2: diethylene glycol di(meth)acrylate
d-3: triethylene glycol di(meth)acrylate
d-4: polyethylene glycol di(meth)acrylate (number average molecular weight 150–1000)
d-5: propylene glycol di(meth)acrylate
d-6: dipropylene glycol di(meth)acrylate
d-7: tripropylene glycol di(meth)acrylate d-8: polypropylene glycol di(meth)acrylate (number average molecular weight 200–1000)
d-9: neopentyl glycol di(meth)acrylate
d-10: 1,3-butanediol di(meth)acrylate
d-11: 1,4-butanediol di(meth)acrylate
d-12: 1,6-hexanediol di(meth)acrylate
d-13: hydroxypivalate neopentyl glycol di(meth)acrylate
d-14:

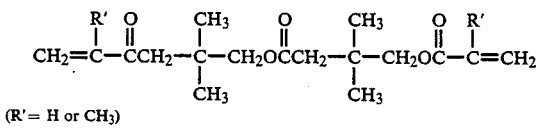

(R' = H or CH$_3$)

d-15:

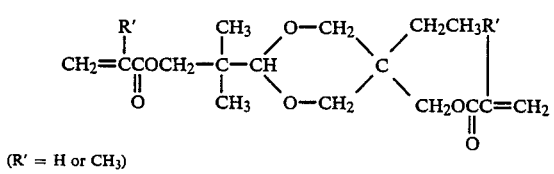

(R' = H or CH$_3$)

d-16: bisphenol A di(meth)acrylate
d-17: trimethylolpropane tri(meth)acrylate
d-18: pentaerythritol tri(meth)acrylate
d-19: dipentaerythritol hexa(meth)acrylate
d-20: pentaerythritol tetra(meth)acrylate
d-21: trimethylolpropane di(meth)acrylate
d-22: dipentaerythritol monohydroxypenta(meth)acrylate Other specific examples include Neomer NA-305 (d-23), Neomer BA-601 (d-24), Neomer TA-505 (d-25), Neomer TA-401 (d-26), Neomer PHA405X (d-27), Neomer EA705X (d-28), Neomer EA400X (d-29), Neomer EE401X (d-30), Neomer EP405X (d-31), Neomer HB601X (d-32) and Neomer HB605X (d-33) [products of Sanyo Chemical Industry Co., Ltd.]; and KAYA-RAD HY220 (d-34), HX-620 (d-35), D-310 (d-36), D-320 (d-37), D-330 (d-38), DPHA (d-39), DPCA-20 (d-40), DPCA-30 (d-41), DPCA-60 (d-42) and DPCA-120 (d-43) [products of Nippon Kayaku Co., Ltd.].

Other examples of the polyfunctional monomer (IV) are compounds represented by the general formula

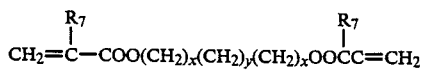

wherein x is an integer of 1 or 2, y is an integer of 4 to 12, R$_7$ is H, CH$_3$, Cl or F.

Specific examples include the following.
d-44: CH$_2$=C(CH$_3$)COOC$_2$H$_4$(CF$_2$)$_4$C$_2$H$_4$OCOC(CH$_3$)=CH$_2$
d-45: CH$_2$=C(CH$_3$)COOC$_2$H$_4$(CF$_2$)$_6$C$_2$H$_4$OCOC(CH$_3$)=CH$_2$
d-46: CH$_2$=C(CH$_3$)COOC$_2$H$_4$(CF$_2$)$_{12}$C$_2$H$_4$OCOC(CH$_3$)=CH$_2$
d-47:

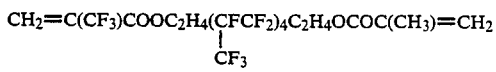

d-48:

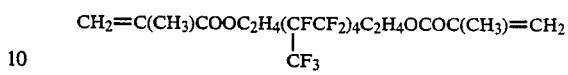

d-49:

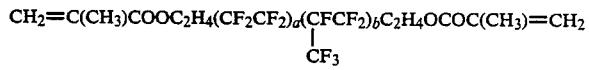

(a and b = 1–4)

Investigations of the present inventors have shown that from the standpoint of the transparency of the cured resin, the polyfunctional monomers (IV) preferably have a methyl group in the molecule, and compounds d-5, d-6, d-7, d-8, d-9, d-13, d-14, d-15, d-17, d-21, d-23 and d-25 are especially preferred. The polyfunctional monomer (IV) may be a mixture of two or more compounds having different structures.

Needless to say, the present invention are not limited at all by the above specific examples.

The proportions of the fluorine-containing polymer (I), the fluorine-containing (meth)acrylate (II), the mono(meth)acrylate (III) and the polyfunctional monomer (IV) in the resin composition of this invention may be selected according to the desired viscosity and refractive index. The present invention have found however that the preferred weight ratios are
(III):(IV)=1:1000 to 95:5,
(II):(III)+(IV)=50:50 to 1000:1,
(I):(II)+(III)+(IV)=1:99 to 10000:1,
and the more preferred weight ratios are
(III):(IV)=1:1000 to 5:1,
(II):(III)=(IV)=50:50 to 100:1,
(I):(II)+(III)+(IV)=1:9 to 9:1.

The fluorine-containing polymer (I) in accordance with this invention is produced by a polymerization method known in the art, such as radical polymerization or anionic polymerization using heat, light, electron beams, or ionizing radiations as a polymerization initiating energy. Industrially, the radical polymerization using heat and/or light as the polymerization initiating energy is preferred. The polymerization may be carried out in bulk or solution. When heat is utilized as the polymerization initiating energy, the polymerization is performed in the absence of a catalyst or in the presence of a polymerization initiator such a azobisbutyronitrile, benzoyl peroxide or methyl ethyl ketone peroxide-cobalt naphthenate. When light such as ultraviolet light is utilized, the polymerization may be expedited by using a so-called photopolymerization initiator known in the art (for example compounds shown in VI-1 to 11 hereinbelow) and as required a light sensor such as an amine compound or a phosphorous compound. In the radical polymerization, the degree of polymerization of the fluorine-containing polymer (I) may be adjusted by using a mercapto group-containing chain transfer agent such as laurylmercaptan, octyl thioglycollate, gamma-mercaptopropyltrimethoxysilane or C$_8$F$_{17}$CH$_2$CH$_2$SH as required. When the polymerization is carried out by using electron beams or ionizing radiation, the addition of the polymerization initiator is not particularly required. When the fluorine-containing polymer (I) is to be prepared by solution polymerization, any solvent can be used which does not adversely affect the polymerization reaction.

When in the resin composition of this invention, the fluorine-containing (meth)acrylate (A) and the mono(meth)acrylate (B) as components of the fluorine-containing polymer (I) are respectively the same as the fluorine-containing (meth)acrylate (II) and the mono(meth)acrylate (II) as components of the resin composition, the resin composition of this invention can be obtained simply by stopping the polymerization of forming the fluorine-containing polymer (I) at a stage where the unreacted fluorine-containing (meth)acrylate (A) and the mono(meth)acrylate (B) remain, and thereafter adding a predetermined amount of the polyfunctional monomer (IV).

The resin composition of this invention may, as required, contain various additives (V) and a photopolymerization initiator (VI) in addition to the fluorine-containing polymer (I), the fluorine-containing (meth)acrylate (II), the mono(meth)acrylate (III) and the polyfunctional monomer (IV) as essential components.

Examples of the additives (V) include a solvent for viscosity adjustment, a light stabilizer, a coloring agent, a coupling agent for increasing the adhesion of the composition to an optical fiber core, a defoamer, a levelling agent and a surface-active agent for uniformly coating the composition on a core, and a surface-modifying agent for controlling the adhesion of the optical fiber to a primary coating agent.

Examples of the coupling agent are silane-type compounds, titanium-type compounds and zircoaluminates. Expecially preferred are silanes such as dimethyldimethoxysilane, dimethyldiethoxysilane, methyltrimethoxysilane, dimethylvinylmethoxysilane, phenyltrimethoxysilane, gamma-chloropropyltrimethoxysilane, gamma-chloropropylmethyldimethoxysilane, gamma-aminopropyltriethoxysilane, gamma-mercaptopropyltrimethoxysilane, gamma-glycidoxypropyltrimethoxysilane, gamma-glycidoxypropylmethyldimethoxysilane, gamma-methacryloxypropylmethoxysilane, gamma-methacryloxypropylmethyldimethoxysilane, gamma-acryloxypropylmethyltrimethoxysilane, and gamma-acryloxypropylmethyldimethoxysilane.

The defoamer, levelling agent and surface-active agent are preferably those containing fluorine.

When it is desired to decrease the refractive index of the resin obtained by curing the resin composition of this invention with active energy rays, increase its transparency and to plasticize it, it is possible to use a non-polymerizable fluorine compound as the additive (V) in addition to the above-exemplified additives. Examples of the non-polymerizable fluorine compound are fluorinated alcohols of the formula $HO-(CH_2)_r-C_sF_{2s+1}$ in which r is an integer of 1 to 4 and s is an integer of 1 to 20, fluorinated carboxylic acids of the formula $HOOC-(CH_2)_t-C_uF_{2u+1}$ in which t is 0 or an integer of 1 to 4, and u is an integer of 1 to 20, fluorinated polyethers commonly called fluorine oils, and compounds commonly called fluorine-type inert liquids such as $N(C_4F_9)_3$, perfluorodecalin, $C_8F_{17}OC_4F_9$ and $C_9F_{20}$. The proportion of the non-polymerizable fluorine compound in the resin composition of this invention is preferably not more than 30% by weight, more preferably not more than 20% by weight, because excessive amounts reduce the strength of the resin after curing.

A cladding film such as a sheath may be formed by coating or impregnating the resin composition of this invention on or in a substrate, particularly an optical fiber core, and then irradiating active energy rays such as light, electron beams or ionizing radiation onto the coated or impregnated substrate to polymerize and cure the resin composition. If desired, heat may also be used jointly as a source of energy. When light such as ultraviolet light is used as the active energy rays, it is preferred to use a photopolymerization initiator (IV) known in the art as a catalyst. Examples of the photopolymerization initiator include benzophenone (IV-1), acetophenone (IV-2), benzoin (IV-3), benzoin ethyl ether (IV-4), benzoin isobutyl ether (IV-5), benzyl methyl ketal (IV-6), azobisisobutyronitrile (IV-7), 1-hydroxycyclohexyl phenyl ketone (IV-8), 2-hydroxy-2-methyl-1-phenylpropan-1-one (IV-9), 1-(4'-isopropylphenyl)-2-hydroxy-2-methylpropan-1-one (IV-10), and 1-(4'-dodecylphenyl)-2-hydroxy-2-methylpropan-1-one (IV-11). As required, the polymerization can be expedited by adding a photosensitizer such as an amine compound or a phosphorus compound. The suitable proportion of the photopolymerization initiator in the resin composition of this invention is 0.01 to 10% by weight, preferably 0.1 to 7% by weight. When the curing is carried out by electron beams or ionizing radiation, the addition of the polymerization initiator is not particularly required.

The solvent may be incorporated in order to control the viscosity and coatability of the resin composition of this invention and the thickness of the coated film. The solvent may be any solvent which does not adversely affect the polymerizability of the resin composition of this invention. Examples of preferred solvents from the standpoint of handlability include alcohols such as methanol, ethanol and isopropanol; ketones such as acetone, methyl ethyl ketone and methyl isobutyl ketone; esters such as methyl acetate, ethyl acetate and butyl acetate; chlorine-containing compounds such as chloroform, dichloroethane and carbon tetrachloride; and low-boiling solvents such as benzotrifluoride, chlorobenzotrifluoride, m-xylene hexafluoride, tetrachlorodifluoroethane, 1,1,2-trichloro-1,2,2-trifluoroethane and trichloromonofluoromethane.

When the resin composition of this invention is coated or impregnated on or in the substrate as a solution in a solvent, a step of eliminating the solvent at room temperature or as required under heating or reduced pressure is required before the curing of the coating is started.

The resin composition of this invention may be coated by various methods known in the art, for example by brush coating, coating by an applicator, a bar coater, a roller brush or a roll coater, spraying by an air spray coater or an airless spray coater, flow coating by a shower coater or a curtain flow coater, dipping, casting, or spinner coating. Such methods are desirably selected properly depending upon the material and shape of the substrate and the use of the coated product.

Particularly, in coating the resin composition of this invention on an optical fiber core and curing it, there can be used methods known in the art, for example a method which comprises continuously dipping an optical fiber core in a reservoir containing the resin composition of this invention and pulling it up, optionally removing the solvent, and irradiating active energy rays on the coated core to cure the coating and form a clad portion; or a method which comprises continuously coating the resin composition of this invention on an optical fiber core by passing it through a coating die to which the resin composition can be continuously supplied, optionally removing the solvent, and irradiating active energy rays on the coated core to cure the coating and form a clad portion (DE-PS 2,459,320, and U.S. Pat. No. 4,125,644).

When the resin composition of this invention is cured by active energy ray irradiation, there can be used ultraviolet light from a light source such as a sterilizer lamp, an ultraviolet fluorescent lamp, a carbon arc, a xenon lamp, a high-pressure mercury lamp for document reproduction, a medium or high pressure mercury lamp, a superhigh pressure mercury lamp, an electrode-free lamp, a metal halide lamp or natural light or electron beams generated by a scanning-type or curtain-type electron beam accelerator. When a coated layer having a thickness of not more than 5 micrometers is to be cured with ultraviolet light, ultraviolet irradiation is preferably carried out in an atmosphere of an inert gas such as nitrogen gas from the standpoint of the efficiency of polymerization.

The core of optical fibers in accordance with this invention may be made of quartz or a plastic such as polymethyl methacrylate, deuterated polymethyl methacrylate, polyethyl methacrylate, polystyrene or polycarbonate.

In curing, the resin composition of this invention does not particularly require a thermal energy, and can be rapidly cured by irradiation of active energy rays. Hence, it is suitable for application to a material which is liable to undergo deformation under heat. When a heat-melted mass of a conventional thermosetting silicone resin or fluorine-containing polymer such as those described above is used in the formation of the clad portion of optical fibers, microbending may occur in the optical fibers owing to shrinkage of the clad portion after curing, and this leads to a marked transmission loss. This problem, however, is obviated when the clad portion is formed by using the resin composition of this invention. Hence, the quality and yield of the optical fibers can be increased by using the resin composition of this invention. The method of forming optical fibers in accordance with this invention has the manufacturing advantage that the drawing speed of the optical fibers becomes 3 to 6 m/sec., and the speed of production of optical fibers is 3 to 5 times as high as that in the prior art. Investigations of the present inventors have also shown that optical fibers obtained by using the resin composition of this invention have an outstandingly good adhesion between the core portion and the clad portion as compared with those of the prior art, and therefore, they have the advantage of withstanding service conditions involving vigorous vibration or bending.

A resin having a refractive index suitable for the intended use can be easily obtained by adjusting the proportions of the components of the resin composition of this invention. Furthermore, since a transparent resin having a refractive index of about 1.36 can be obtained, it permits the production of optical fibers having a large numerical aperture and a large diameter.

Since the resin composition of this invention can give a dynamically tough clad portion, it permits connection of plastic-clad optical fibers having a quartz core through a connector by only caulking without using an adhesive.

The resin composition of this invention can also be used to form a coating of a low refractive index on the surface of a transparent substrate such as glass or a transparent plastic material because of its low refractive index.

The resin composition of this invention may also be used as a protective coating for various materials and substrates because it gives a cured coating having excellent scratch resistance, oil resistance, smoothness, abrasion resistance, water repellence, oil repellence, water resistance, moisture resistance, corrosion resistance, antifouling property, peelability and releasability and low water absorption.

For example, it is useful as a protective coating for the surface of a nonmagnetic metal such as copper, aluminum or zinc; the surfaces of plastics, for example, polyesters such as polyethylene terephthalate and polyethylene-2,6-naphthalate, polyolefins such as polypropylene, cellulose derivatives such as cellulose acetate, and polycarbonate; the surfaces of ferromagnetic alloys (alloys containing iron, cobalt and/or nickel as a main component and small amounts of aluminum, silicon, chromium, manganese, molybdenum, titanium, various heavy metals or rare earth metals) vapor-deposited on glass, paper, wood, fibers, and ceramics; and the surfaces of magnetic layers of magnetic tapes or discs obtained by vapor-depositing a magnetic material such as iron, cobalt or chromium on plastic films such as a polyester films in the presence of a tiny amount of oxygen. It can also be suitably applied as a surface or back surface treating agent for magnetic recording media such as magnetic tapes or floppy discs which particularly require abrasion resistance.

The resin composition of this invention can form a transparent, smooth thin coating even on the surface of glass, and can be used in applications requiring oil resistance and wiping resistance, for example as an oil soiling preventing agent for various optical devices and instruments.

It is also suitable as a protective film or coating for solar cells, optical fibers, optical fiber cables, optical discs and optical magnetic discs which particularly require moisture resistance. Furthermore, because of its excellent scratch resistance, antifouling property and moisture resistance, it can also be used for surface protection of medical devices and instruments and of teeth and false teeth, and as a dental filler or mold.

The resin composition of this invention can also be used as a hard coating agent for various molded articles, films and sheets because it can form a coating having excellent scratch resistance.

The resin composition can be formed into a paint or ink having excellent antifouling property or non-tackiness by mixing it with a pigment or a dispersing agent.

The following Synthesis Examples and Examples illustrate the present invention more specifically. It should be understood that the invention is not limited at all by these examples. All parts and percentages in these examples are by weight.

The properties of the cured resins obtained by irradiation of active energy rays were evaluated by the following methods.

TRANSPARENCY

The resin composition of the invention was cured by using an 80 W/cm high-pressure mercury lamp. A chip having a thickness of 5 mm was prepared from the cured resin, and its light transmittance I (%) at a wavelength of 650 nm was measured. The light transmission loss was calculated in accordance with the following equation and the transparency of the cured resin was evlauated. The smaller the transmission loss, the better the transparency.

Transmission loss = log $(I_o/I)$ (dB/km)

ADHESION

The resin composition of this invention was coated to a cured film thickness of 100 micrometers on a plate of polymethyl methacrylate (Acrylite L-#001 made by Mitsubishi Rayon Co., Ltd.; thickness 2 mm), a plate of polystyrene (Styron made by Dow Chemical Co.; thickness 2 mm) and a glass plate (thickness 5 mm). As a source of active energy rays, a high-pressure mercury lamp (160 W/cm; composed of two members of the light concentrating type), the coatings were each cured at a conveyor speed of 200 m/min.

For comparison, a heat-meltable fluorine-containing resin was hot-pressed at 200° C. under 100 kg/cm² for 5 minutes to give a film having a thickness of 100 micrometers. The film was superimposed on the surface of a substrate and laminated to it at 230° C. under 5 kg/cm² for 10 seconds.

The samples were subjected to an adhesion test, and evaluated in accordance with the standards of JIS 5400.

| Rating | State of scratch |
|---|---|
| 10 | Each of the scratches were slender and smooth at both sides. No peeling occurred in the crossing points of the scratches and the cut squares. |
| 8 | Slight peeling occurred in the crossing points of the scratches, but the cut squares were not peeled. The area of the peeled portions was less than 5% of the total area of the squares. |
| 6 | Peeling occurred at both sides of the scratches and the crossing points of the scratches. The area of the peeled portions was 5 to 15% of the total area of the squares. |
| 4 | The peel width by the scratches was large, and the area of the peeled portions was 15 to 35% of the total area of the squares. |
| 2 | The peel width by the scratches was larger than in the case of a rating of 4, and the area of the peeled portions was 35 to 65% of the total area of the squares. |
| 0 | The area of the peeled portions was more than 65% of the total area of the squares. |

LIGHT TRANSMISSION PROPERTY

The light transmission property of the optical fiber was evaluated by measuring the transmission loss (dB/Km) by means of the same type of the device as shown in FIG. 4 of Japanese Laid-Open Patent Publication No. 7602/1983. The measuring conditions were as follows:

| | |
|---|---|
| Interference filter (dominant wavelength): | 650 micrometers |
| Total length of the optical fiber: | 5 m |
| Cut length of the optical fiber: | 4 m |
| Bobbin diameter: | 190 mm |

MANDREL TEST

To evaluate the adhesion of the cladding to an optical fiber core and its toughness, the optical fiber was wound around a mandrel having a diameter of 5 mm. The adhesion of the cladding to the optical fiber core and the occurrence of cracks in the clad portion were observed under a microscope. The results were evaluated by the following ratings.

Rating 3: No change in the adhesion between the core portion and the clad portion nor occurrence of cracks in the clad portion was observed.

Rating 2: Slight change in the adhesion between the core portion and the clad portion, and/or slight occurrence of cracks in the clad portion was observed.

Rating 1: Peeling occurred between the core portion and the clad portion, and/or cracks occurred in the clad portion.

The abbreviations used to denote compounds hereinafter are those used hereinabove. A after the abbreviations mean that the compounds are acrylates, and M after the abbreviations mean that the compounds are methacrylates.

SYNTHESIS EXAMPLE 1

Synthesis of a-1/b-2/n-butyl acrylate = 90/5/5 (%) copolymer

A 500 ml four-necked round-bottomed flask equipped with a cooling condenser, a thermometer and a stirrer was charged with 180 g of a-1, 10 g of b-2, 10 g of n-butyl acrylate (c) and 1 g of azobisisobutyronitrile (to be referred to as AIBN hereinafter), and the mixture was stirred at 70° C. for 30 minutes in an atmosphere of $N_2$ gas. The mixture was further stirred for 5 minutes at 120° C., and a polymer mass which was viscous under heat was taken out.

The polymer had a molecular weight ($\overline{Mn}$), measured by GPC (calculated for styrene), of 920,000 and contained 56.1% of fluorine atoms. In an atmosphere at 25° C., the polymer was transparent and had a refractive index $n_D^{25}$ of 1.368.

SYNTHESIS EXAMPLE 2

Synthesis of a-1/c-5(a)/c-4(A) = 90/8/2 copolymer

A 500 ml four-necked round-bottomed flask equipped with a cooling condenser, a thermometer and a stirrer was charged with 180 g of a-1, 18 g of c-5(a), 2 g of c-4(a) and 1 g of AIBN, and the mixture was stirred at 70° C. for 15 minutes in an atmosphere of $N_2$ gas. A polymer mass which was viscous under heat was taken out.

The polymer had a molecular weight ($\overline{Mn}$), measured by GPC (calculated for styrene), of 460,000 and contained 56.1% of fluorine atoms. In an atmosphere at 25° C., the polymer was transparent and had a refractive index $n_D^{25}$ of 1.370.

SYNTHESIS EXAMPLES 3–48 AND COMPARATIVE SYNTHESIS EXAMPLES 1–3

Various fluorine-containing polymers were synthesized as in Synthesis Examples 1 and 2. Table 1 summarizes the molecular weights and refractive indices of the resulting polymers.

TABLE 1

| Synthesis Example | Comonomer proportions (%) | Molecular weight Mn (calculated for styrene) | Fluorine content (%) | Refractive index $n_D^{25}$ |
|---|---|---|---|---|
| 3 | a-2/b-13(m = 6)/methyltripropylene glycol acrylate (C) 93/4/3 | $102 \times 10^4$ | 56.4 | 1.360 |
| 4 | a-45/b-17(m = 8) 90/10 | $126 \times 10^4$ | 53.0 | 1.352 |
| 5 | a-1/b-14(p = 3, m = 8)/i-butyl methacrylate (C) 85/10/5 | $117 \times 10^4$ | 53.0 | 1.372 |
| 6 | a-1/b-3/polypropylene glycol monomethacrylate (molecular weight 400) (C) 50/5/45 | $156 \times 10^4$ | 31.2 | 1.435 |
| 7 | a-40/b-6/ethylcarbitol methacrylate (C) 82/5/13 | $96 \times 10^4$ | 48.5 | 1.385 |
| 8 | a-41/b-18/butoxyethyl acrylate (C) 90/3/7 | $162 \times 10^4$ | 51.6 | 1.370 |
| 9 | a-47/b-5/c-3(A)/c-4(A) 90/3/4/3 | $11 \times 10^4$ | 45.5 | 1.404 |
| 10 | a-50/b-7/methyl methacrylate (C) 84/10/6 | $7 \times 10^4$ | 44.4 | 1.402 |
| 11 | a-1/b-6/c-3(M)/c-4(A)/c-5(A) 88/3/4/3/2 | $150 \times 10^4$ | 54.9 | 1.374 |
| 12 | a-1/b-1/c-3(M)/c-4(A)/c-5(A) 88/3/4/3/2 | $147 \times 10^4$ | 54.9 | 1.374 |
| 13 | a-1/b-6/methyl methacrylate(C)/c-5(A) 88/3/7/2 | $148 \times 10^4$ | 54.9 | 1.373 |
| 14 | a-1/b-6/c-3(M)/c-4(A)/c-5(A) 88/3/7/1/1 | $140 \times 10^4$ | 54.9 | 1.374 |
| 15 | a-1/b-6/c-3(M)/c-5(A) 88/3/6/3 | $145 \times 10^4$ | 54.9 | 1.375 |
| 16 | a-1/b-6/c-3(M)/c-4(A)/c-5(A) 88/3/4/3/2 | $16 \times 10^4$ | 54.9 | 1.375 |
| 17 | a-1/b-6/c-3(M)/c-4(A)/c-5(A) 88/3/4/3/2 | 2,600 | 54.9 | 1.374 |
| 18 | a-1/b-6/c-3(M)/c-4(A)/c-5(A) 50/13/17/13/7 | $137 \times 10^4$ | 31.2 | 1.438 |
| 19 | a-1/b-1 88/12 | $103 \times 10^4$ | 54.9 | 1.376 |
| 20 | a-1/c-3(M)/c-4(A)/c-5(A) 88/5/4/3 | $78 \times 10^4$ | 54.9 | 1.375 |
| 21 | a-47/b-6/c-3(M)/c-4(A)/c-5(A) 88/3/4/3/2 | $100 \times 10^4$ | 44.4 | 1.402 |
| 22 | a-1/c-5(A) 90/10 | $43 \times 10^4$ | 56.1 | 1.372 |
| 23 | a-1/c-2(A) 70/30 | $52 \times 10^4$ | 43.7 | 1.407 |
| 24 | a-2/c-3(M) 95/5 | $26 \times 10^4$ | 57.6 | 1.362 |
| 25 | a-1/c-4(A) 90/10 | $31 \times 10^4$ | 56.1 | 1.373 |
| 26 | a-1/t-butyl methacrylate (C) 90/10 | $39 \times 10^4$ | 56.1 | 1.373 |
| 27 | a-1/c-5(M) 50/50 | $40 \times 10^4$ | 31.2 | 1.432 |
| 28 | a-33/2-ethylhexyl acrylate (C) 60/40 | $19 \times 10^4$ | 37.6 | 1.425 |
| 29 | a-26/c-1(A)/c-7(A) 98/1/1 | $24 \times 10^4$ | 40.1 | 1.412 |
| 30 | a-23/c-5(M) 75/25 | $23 \times 10^4$ | 44.0 | 1.388 |
| 31 | a-1/c-3(M)/c-4(A)/c-5(a) 87/7/2/4 | $16 \times 10^4$ | 54.2 | 1.379 |
| 32 | a-1/c-4(A)/c-5(A) 87/4/9 | $20 \times 10^4$ | 54.2 | 1.379 |
| 33 | a-1/c-3(M)/c-5(A) 87/9/4 | $18 \times 10^4$ | 54.2 | 1.378 |
| 34 | a-1/c-3(M)/c-4(A) 87/11/2 | $17 \times 10^4$ | 54.2 | 1.379 |
| 35 | a-1/c-2(A) 87/13 | $15 \times 10^4$ | 54.2 | 1.379 |
| 36 | a-1/2-ethylhexyl acrylate (C) 87/13 | $16 \times 10^4$ | 54.2 | 1.379 |
| 37 | a-1/i-butyl acrylate (C) 87/13 | $14 \times 10^4$ | 54.2 | 1.377 |
| 38 | a-1/methyl methacrylate (C) 87/13 | $33 \times 10^4$ | 54.2 | 1.377 |
| 39 | a-1/c-3(M)/c-4(A)/c-5(A) 87/7/2/4 | $110 \times 10^4$ | 54.2 | 1.379 |
| 40 | a-1/c-3(M)/c-4(A)/c-5(A) 87/7/2/5 | 4000 | 54.2 | 1.374 |
| 41 | a-1/c-3(M)/c-4(A)/c-5(A) | $34 \times 10^4$ | 59.2 | 1.366 |

TABLE 1-continued

| Synthesis Example | Comonomer proportions (%) | Molecular weight Mn (calculated for styrene) | Fluorine content (%) | Refractive index $n_D^{25}$ |
|---|---|---|---|---|
| 42 | a-1/c-3(M)/c-4(A)/c-5(A) 95/2.5/1.5/1 | $42 \times 10^4$ | 31.2 | 1.437 |
| 43 | a-1/c-3(A)/c-4(A)/c-5(a) 50/25/15/10 | $10 \times 10^4$ | 53.6 | 1.379 |
| 44 | a-1/c-4(A)/c-5(A) 86/7/4/3 | $35 \times 10^4$ | 53.0 | 1.377 |
| 45 | a-1/c-3(A)/c-4(A) 85/2/13 | $37 \times 10^4$ | 53.0 | 1.377 |
| 46 | a-1/i-propyl acrylate (C) 85/13/2 | $42 \times 10^4$ | 56.1 | 1.370 |
| 47 | a-1/polypropylene glycol methacrylate (molecular weight 1000) (C) 80/20 | $38 \times 10^4$ | 49.9 | 1.385 |
| 48 | a-1/methyl methacrylate (C) 90/10 | $42 \times 10^4$ | 56.1 | 1.372 |
| Comparison 1 | a-1/b-6/c-3(M)/c-4(A)/c-5(A) 46/13.5/18/13.5/9 | $102 \times 10^4$ | 28.7 | 1.445 |
| Comparison 2 | a-1/c-3(M)/c-4(A)/c-5(A) 43/30.7/8.8/17.5 | $17 \times 10^4$ | 26.8 | 1.449 |
| Comparison 3 | a-1 | $40 \times 10^4$ | 62.4 | 1.341 |

SYNTHESIS EXAMPLE 49

Synthesis of a-7/b-17/t-butyl methacrylate (c)=80/10/10 (%) copolymer

A 500 ml four-necked round-bottomed flask equipped with a cooling condenser, a thermometer and a stirrer was charged with 80 g of a-7, 10 g of b-17, 10 g of t-butyl methacrylate (c), 1 g of laurylmercaptan, 0.3 g of AIBN and 230 g of 1,1,1-trichloroethane, and in an atmosphere of N₂ gas, the mixture was reacted at 80° C. for 10 hours. The solvent was evaporated under reduced pressure to give the desired polymer. The polymer had a fluorine atom content of 47.3%, a $\overline{M}n$ of 110,000 and a $n_D^{25}$ of 1.371.

SYNTHESIS EXAMPLE 50

Synthesis of a-1/c-5(A)/n-butyl acrylate (c)=90/5/5 (%) copolymer

A 500 ml four-necked round-bottomed flask equipped with a cooling condenser, a thermometer and a stirrer was charged with 90 g of a-1, 5 g of c-5(A), 5 g of t-butyl acrylate (c), 0.5 g of octyl thioglycollate, 0.3 g of AIBN and 230 g of 1,1,1-trichloroethane, and in an atmosphere of N₂ gas, the mixture was reacted at 80° C. for 10 hours. The solvent was evaporated under reduced pressure to give the desired polymer. The polymer had a fluorine atom content of 56.1%, a $\overline{M}n$ of 120,000 and a $n_D^{25}$ of 1.373.

SYNTHESIS EXAMPLES 51-56

Various fluorine-containing polymers were synthesized as in Synthesis Examples 49 and 50. Table 2 summarizes the molecular weights and refractive indices of these polymers.

TABLE 2

| Synthesis Example | Comonomer proportions (%) | Molecular weight Mn (calculated for styrene) | Fluorine content (%) | Refractive index $n_D^{25}$ |
|---|---|---|---|---|
| 51 | a-27/b-2 97/3 | $8.5 \times 10^4$ | 36.9 | 1.415 |
| 52 | a-47/b-15(m = 6)/i-butyl methacrylate 90/4/6 | $14 \times 10^4$ | 45.5 | 1.395 |
| 53 | a-39/b-18 96/4 | $9.2 \times 10^4$ | 46.5 | 1.335 |
| 54 | a-1/c-4(M)/2-hydroxypropyl acrylate (C) 80/13/7 | $8 \times 10^4$ | 49.9 | 1.386 |
| 55 | a-11/c-6 (A) 70/30 | $13 \times 10^4$ | 48.2 | 1.400 |
| 56 | a-1/ethylacrylate (C) 80/20 | $9 \times 10^4$ | 49.9 | 1.389 |

SYNTHESIS EXAMPLE 57

Synthesis of a-1/neopentyl glycol monomethacrylate (c)=95/5 (%) copolymer.

A 500 ml glass cylindrical flask equipped with a stirrer was charged with 380 g of a-1, 20 g of neopentyl glycol monomethacrylate (c), 2 g of octyl thioglycollate, and 12 g of VI-9 as a photopolymerization initiator, and with stirring at 60° C., two 60 W fluorescent lamps for ultraviolet light were irradiated from the sides of the flask and the reaction was carried out for 1 hour. By this operation, a viscous polymer having a viscosity of 200 poises at 60° C. was obtained. The polymer had a molecular weight ($\overline{M}n$), determined by GPC, of 8,000 and a fluorine atom content of 59.2%. The amount of the unreacted monomers determined by gas chromatography was 24% based on the total weight of the polymer. The refractive index $n_D^{25}$ of the polymer was 1.352.

SYNTHESIS EXAMPLE 58

A 500 ml glass cylindrical flask equipped with a stirrer was charged with 372 g of a-1, 28 g of c-3 (M), and 0.72 g of VI-9 as a photopolymerization initiator, and with stirring at 60° C., one 60 W fluorescent lamp for ultraviolet light was irradiated from the sides of the flask and the reaction was carried out for 16 seconds. By this operation, a viscous polymer having a viscosity of 10,000 centipoises at 50° C. was obtained. The polymer was transparent in an atmosphere at 25° C., and had a fluorine atom content of 58.0%, a molecular weight ($\overline{\mathrm{Mn}}$), determined by GPC, of 36,000 and a refractive index $n_D^{25}$ of 1.365. The amount of the unreacted monomers determined by gas chromatography was 17% based on the total weight of the polymer.

SYNTHESIS EXAMPLES 59–81 AND COMPARATIVE SYNTHESIS EXAMPLES 4–6

Fluorine-containing polymers were synthesized as in Synthesis Example 58. The results are summarized in Table 3.

TABLE 3

| Synthesis Example | Comonomer proportions (%) | Irradiation time (sec) | Amount of the unreacted monomers (%) | Viscosity (cps/25° C.) | Refractive index $n_D^{25}$ | Fluorine content (%) |
| --- | --- | --- | --- | --- | --- | --- |
| 59 | a-1/b-6/c-3(M)/c-4(A)/C-5(A) 88/3/4/3/2 | 12 | 20 | 13,000 | 1,374 | 54.9 |
| 60 | a-1/b-6/c-3(M)/c-4(A)/C-5(A) 88/3/4/3/2 | 7 | 44 | 6,800 | 1.373 | 54.9 |
| 61 | a-10/b-9/c-4(A) 53/7/40 | 9 | 23 | 10,000 | 1.430 | 32.3 |
| 62 | a-2/b-13(m = 6)/methyltripropylene glycol acrylate (C) 93/4/3 | 16 | 9 | 28,000 | 1.361 | 56.5 |
| 63 | a-1/b-1 88/12 | 14 | 33 | 9,900 | 1.376 | 54.9 |
| 64 | a-1/c-3(M) 93/7 | 10 | 29 | 6,000 | 1.365 | 58.0 |
| 65 | a-1/c-5(A)/c-4(A) 90/9/1 | 16 | 13 | 8,700 | 1.369 | 56.1 |
| 66 | a-38/c-3(M)/c-4(M) 80/17/3 | 8 | 36 | 5,700 | 1.368 | 55.5 |
| 67 | a-1/t-butyl methacrylate (C)/c-4(A) 60/36/4 | 80 | 3 | 480,000 | 1.418 | 37.4 |
| 68 | a-1/c-7(A)/c-4(A) 95/3/2 | 5 | 42 | 2,000 | 1.362 | 59.2 |
| 69 | a-1/c-5(M)/c-4(M) 85/10/5 | 7 | 38 | 3,600 | 1.377 | 53.0 |
| 70 | a-2/c-5(A)/c-4(A) 90/7/3 | 10 | 27 | 5,800 | 1.370 | 54.6 |
| 71 | a-1/ethyl acrylate (C) 90/10 | 30 | 15 | 290,000 | 1.371 | 56.1 |
| 72 | a-1/c-3(M)/c-4(A)/c-5(A) 87/7/2/4 | 20 | 23 | 12,000 | 1.379 | 54.3 |
| 73 | a-1/c-3(A)/c-4(A)/c-5(A) 87/7/2/4 | 9 | 21 | 14,000 | 1.379 | 54.3 |
| 74 | a-1/c-3(M)/c-5(A) 87/9/4 | 20 | 26 | 10,700 | 1.378 | 54.3 |
| 75 | a-1/c-3(M)/c-4(A)/c-5(A) 87/7/2/4 | 4 | 48 | 3,600 | 1.378 | 54.3 |
| 76 | a-1/2-ethylhexyl acrylate (C) 87/13 | 18 | 19 | 14,800 | 1.379 | 54.3 |
| 77 | a-1/i-butyl acrylate (C) 87/13 | 15 | 21 | 13,000 | 1.378 | 54.3 |
| 78 | a-1/methyl methacrylate (C) 87/13 | 49 | 22 | 9,800 | 1.378 | 54.3 |
| 79 | a-1/c-3(A)/c-4(A)/c-5(A) 86/7/4/3 | 13 | 31 | 7,600 | 1.378 | 53.6 |
| 80 | a-1/c-4(A)/c-5(A) 85/2/13 | 10 | 27 | 11,000 | 1.377 | 53.0 |
| 81 | a-1/c-3(A)/c-4(A) 85/13/2 | 8 | 29 | 11,500 | 1.377 | 53.0 |
| Comparison 4 | a-1/b-6/c-3(M)/c-4(A)/c-5(A) 46/13.5/18/13.5/9 | 22 | 28 | 8,700 | 1.442 | 28.7 |
| Comparison 5 | a-1/c-3(M)/c-4(A)/c-5(A) 43/30.7/8.8/17.5 | 19 | 35 | 7,000 | 1.447 | 26.8 |
| Comparison 6 | a-1 | 11 | 44 | 5,900 | 1.340 | 62.4 |

As shown in Synthesis Examples 59 to 81, the fluorine-containing polymer (I) of this invention can be efficiently produced also by the photopolymerization method. The fluorine-containing polymers could be obtained by using a 15 W white-color fluorescent lamp or solar light instead of the 80 W/cm high-pressure mercury lamp.

EXAMPLES 1–59 AND COMPARATIVE EXAMPLES 1–16

In each run, an active energy ray-curable resin composition (Examples 1 to 59 and Comparative Examples 1 to 13) was prepared from each of the fluorine-containing polymers (I) obtained in Synthesis Examples 1 to 81 and Comparative Synthesis Examples 1 to 6, a fluorine-containing (meth)acrylate (II), a mono(meth)acrylate (III), a polyfunctional monomer (IV), an additive (V) and a photopolymerization initiator (VI). Details of the resulting resin compositions are shown in Table 4-1. Table 4-2 summarizes the adhesion of the resin compositions to a polymethyl methacrylate plate, a polystyrene plate and a glass plate, and their various properties as optical fiber cladding.

For comparison, similar data obtained by using known resins (Comparative Examples 14 to 16) are shown in Table 5.

In Examples 1 to 59 and Comparative Examples 1 to 13, an optical fiber was formed by continuously dipping an optical fiber core in a bath of the resin composition, pulling it up continuously, and irradiating ultraviolet light from three 160 W/cm high-pressure mercury lamps of the light converging type at a drawing speed of 300 m/min.

Optical fibers used in Comparative Examples 14 and 15 were formed by coating optical fiber cores with the fluorine-containing polymers melted at the temperatures indicated in Table 5, and cooling the coatings in air.

The silicone resin shown in Comparative Example 16 was cured at 150° C. for 1 minute. The drawing speed of the optical fibers at this time was 5 m/min.

Optical fibers having cores of polymethyl methacrylate or polystyrene were produced in a core diameter of 500 micrometers and a cladding thickness of 40 micrometers. Optical fibers having a core of quartz were produced in a core diameter of 250 micrometers and a cladding thickness of 30 micrometers.

In the following tables the following abbreviations are used.

RM: an optical fiber having a core of polymethyl methacrylate
PS: an optical fiber having a core of polystyrene
G: an optical fiber having a core of quartz It is seen from Tables 4-1, 4-2 and 5 that the active energy ray-curable resin compositions of this invention can give much better optical fibers than can conventional cladding materials. It is particularly noted from Comparative Examples 10 to 13 that the fluorine-containing polymers in accordance with this invention are essential components in obtaining optical fibers of good quality.

It has been found in accordance with this invention that an optical fiber composed of a core of quartz and a cladding of the resin composition of this invention (plastic-clad fiber abbreviated as PCF) has high dynamic strength and permits better connection by caulking (without using an adhesive) through a connector than conventional PCF. PCFs formed from the resin compositions containing dicyclopentanyl (meth)acrylate (c-3) as the mono(meth)acrylate (III) (Examples 14, 35, 37 and 39) showed particularly good caulking properties.

TABLE 4-1

| | | | | Active energy ray-curable resin composition | | | | | |
|---|---|---|---|---|---|---|---|---|---|
| | I (parts) | II (parts) | III (parts) | IV (parts) | V (parts) | VI (parts) | Viscosity (cps/25° C.) | log($I_o$/I) (dB/Km) | Refractive index $n_D^{25}$ |
| Example 1 | Compound of Synthesis Example 1 50 | a-1 45 | n-butyl acrylate (C) 5 | d-9(A) 1 | — | VI-9 4 | 8500 | 24000 | 1.362 |
| Example 2 | Compound of Synthesis Example 1 40 | a-2 50 | i-butyl acrylate (C) 2 | d-21(A) 5 | — | VI-9 3 | 7200 | 23000 | 1.359 |
| Example 3 | Compound of Synthesis Example 1 60 | a-27 30 | — | polypropylene glycol dimethacrylate (molecular weight 400) (d) 5 | MEGAFAC F-177(*) 5 | VI-9 3 | 8800 | 25000 | 1.370 |
| Example 4 | Compound of Synthesis Example 3 30 | a-47 20 a-23 40 | — | d-15(A) 10 | — | VI-10 4 | 3600 | 27000 | 1.357 |
| Example 5 | Compound of Synthesis Example 3 30 | a-47 20 a-23 40 | c-4(A) 5 | d-15(A) 10 | — | VI-10 4 | 3500 | 22000 | 1.359 |
| Example 6 | Compound of Synthesis Example 3 30 | a-47 20 a-23 40 | C-4(A) 5 | d-17(A) 10 | — | VI-10 4 | 3500 | 21000 | 1.358 |
| Example 7 | Compound of Synthesis Example 8 40 | a-41 50 | t-butyl acrylate (C) 5 | d-17(A) 5 | — | VI-11 5 | 4200 | 23000 | 1.380 |
| Example 8 | Compound of Synthesis Example 8 40 | a-41 50 | c-5(A) 5 | d-17(A) 5 | — | VI-11 5 | 4200 | 20100 | 1.380 |
| Example 9 | Compound of Synthesis | a-41 | c-5(A) | 1,6-hexanediol | — | VI-11 | 4200 | 40000 | 1.380 |

TABLE 4-1-continued

| | Active energy ray-curable resin composition | | | | | | | | |
|---|---|---|---|---|---|---|---|---|---|
| | I (parts) | II (parts) | III (parts) | IV (parts) | V (parts) | VI (parts) | Viscosity (cps/25° C.) | log($I_0$/I) (dB/Km) | Refractive index $n_D^{25}$ |
| | Example 8 40 Compound of Synthesis Example 8 | 50 a-41 | 5 ethyl acrylate (C) | diacrylate (d) 5 d-17(A) | — | 5 VI-11 | 4400 | 47000 | 1.382 |
| Example 10 | | | | | | | | | |
| Example 11 | 40 Compound of Synthesis Example 8 | 50 a-41 | 5 2-ethylhexyl acrylate (C) | 5 d-17(A) | — | 5 VI-11 | 4400 | 23000 | 1.380 |
| Example 12 | 40 Compound of Synthesis Example 51 | 50 a-1 | 5 neopentyl glycol monomethacrylate (C) | 5 d-9(A) | — | 5 VI-9 | 4400 | 22900 | 1.349 |
| Example 13 | 50 Compound of Synthesis Example 11 | 47.5 a-1 | 2.5 c-4(A) 1 c-5(A) 4 | d-9(A) 5 d-17(A) 5 | — | 4 VI-9 0.5 | 4800 | 19000 | 1.369 |
| Example 14 | 60 Compound of Synthesis Example 11 | 25 a-1 | c-4(A) 1 c-3(A) 4 | d-9(A) 5 d-17(A) 5 | — | 0.5 VI-9 0.5 | 4900 | 18700 | 1.370 |
| Example 15 | 60 Compound of Synthesis Example 11 | 25 a-47 | c-4(A) 1 c-5(A) 4 | d-9(A) 5 d-17(A) 5 | — | 0.5 VI-9 0.5 | 5200 | 21600 | 1.371 |
| Example 16 | 60 Compound of Synthesis Example 11 | 25 a-1 | 5 ethyl acrylate (C) | 5 d-17(A) | — | 3 VI-9 | 4200 | 23000 | 1.370 |
| Example 17 | 60 Compound of Synthesis Example 11 | 25 a-1 | 5 i-butyl acrylate (C) | 10 d-17(A) | — | 3 VI-9 | 4500 | 22000 | 1.369 |
| Example 18 | 60 Compound of Synthesis Example 11 | 25 a-1 | 5 c-5(A) | 10 d-17(A) | — | 3 VI-9 | 4600 | 21300 | 1.370 |
| Example 19 | 60 Compound of Synthesis Example 11 | 25 a-1 | 5 c-5(A) | 10 d-20(A) | — | 3 VI-9 | 5100 | 29000 | 1.371 |
| Example 20 | 60 Compound of Synthesis Example 12 | 25 a-1 | 5 c-5(A) | 10 d-17(A) | — | 3 VI-9 | 4700 | 23000 | 1.373 |
| Example 21 | 60 Compound of Synthesis Example 13 | 25 a-1 | 5 c-5(A) | 10 d-17(A) | — | 3 VI-9 | 4600 | 26000 | 1.370 |
| Example 22 | 60 Compound of Synthesis Example 15 | 25 a-1 | 5 c-5(A) | 10 d-17(A) | — | 3 VI-9 | 4800 | 24000 | 1.370 |
| Example 23 | 60 Compound of Synthesis Example 17 | 25 a-1 | 5 c-5(A) | 10 d-17(A) | — | 3 VI-9 | 720 | 19000 | 1.369 |
| Example 24 | 60 Compound of Synthesis Example 18 | 25 a-1 | 5 c-5(A) | 10 d-17(A) | — | 3 VI-9 | 5200 | 20000 | 1.425 |
| Example 25 | 60 Compound of Synthesis Example 19 | 25 a-1 | 5 c-5(A) | 10 d-17(A) | — | 3 VI-9 | 5600 | 29000 | 1.370 |
| Example 26 | 60 Compound of Synthesis Example 20 | 25 a-1 | 5 c-5(A) | 10 d-44(A) | — | 3 VI-9 | 4400 | 18500 | 1.369 |
| Example 27 | 60 Compound of Synthesis Example 21 | 25 a-1 | 5 c-5(A) | 10 d-44(A) | — | 3 VI-9 | 6000 | 30000 | 1.397 |
| | 60 Compound of | 25 | 5 | 10 | | 3 | | | |

TABLE 4-1-continued

| | Active energy ray-curable resin composition | | | | | | | | Refractive |
|---|---|---|---|---|---|---|---|---|---|
| | I (parts) | II (parts) | III (parts) | IV (parts) | V (parts) | VI (parts) | Viscosity (cps/25° C.) | log($I_o$/I) (dB/Km) | index $n_D^{25}$ |
| Example 28 | Compound of Synthesis Example 59 60 | a-1 25 | c-5(A) 5 | d-44(A) 10 | — | VI-9 3 | 7200 | 18000 | 1.370 |
| Example 29 | Compound of Synthesis Example 60 60 | a-1 25 | c-5(A) 5 | d-44(A) 10 | — | VI-9 3 | 2700 | 17800 | 1.369 |
| Example 30 | Compound of Synthesis Example 2 40 | a-1 52 | c-5(A) 4 | d-9(A) 4 | — | VI-9 3 | 8700 | 20500 | 1.371 |
| Example 31 | Compound of Synthesis Example 2 40 | a-1 52 | c-5(A) 4 | d-9(A) 4 | γ-mercaptopropyl trimethoxysilane 0.3 | VI-9 3 | 8700 | 21500 | 1.372 |
| Example 32 | Compound of Synthesis Example 2 30 | a-1 52 | c-5(A) 11 c-4(A) 3 | d-9(A) 4 | — | VI-9 3 | 6100 | 19000 | 1.371 |
| Example 33 | Compound of Synthesis Example 22 70 | a-33 20 | c-5(A) 6 | d-6(A) 4 | — | VI-9 3 | 9000 | 22000 | 1.377 |
| Example 34 | Compound of Synthesis Example 22 70 | a-33 20 | c-5(A) 6 | d-6(A) 4 | γ-chloropropyl trimethoxysilane 0.2 | VI-9 3 | 9000 | 22500 | 1.378 |
| Example 35 | Compound of Synthesis Example 26 20 | a-1 72 | c-3(M) 4 | d-17(A) 4 | γ-methacryloylpropyl trimethoxy silane 0.2 | VI-10 3 | 3500 | 26000 | 1.372 |
| Example 36 | Compound of Synthesis Example 50 50 | a-23 30 | c-5(A) 7 c-4(M) 10 | d-6(M) 3 | — | VI-9 4 | 4000 | 25500 | 1.383 |
| Example 37 | Compound of Synthesis Example 25 20 | a-1 72 | c-3(M) 4 | d-17(A) 4 | — | VI-10 3 | 3500 | 20500 | 1.372 |
| Example 38 | Compound of Synthesis Example 31 60 | a-1 25 | c-4(A) 1 c-5(A) 4 | d-9(A) 5 d-17(A) 5 | — | VI-9 0.5 | 4900 | 19000 | 1.373 |
| Example 39 | Compound of Synthesis Example 31 60 | a-1 25 | c-4(A) 1 c-3(A) 4 | d-9(A) 5 d-17(A) 5 | — | VI-9 0.5 | 5300 | 18800 | 1.374 |
| Example 40 | Compound of Synthesis Example 31 60 | a-47 25 | c-4(A) 1 c-5(A) 4 | d-9(A) 5 d-17(A) 5 | — | VI-9 0.5 | 6000 | 22200 | 1.373 |
| Example 41 | Compound of Synthesis Example 31 60 | a-1 25 | ethyl acrylate 5 | d-17(A) 10 | — | VI-9 3 | 4400 | 24000 | 1.373 |
| Example 42 | Compound of Synthesis Example 31 60 | a-1 25 | i-butyl acrylate (C) 5 | d-17(A) 10 | — | VI-9 3 | 4700 | 21100 | 1.372 |
| Example 43 | Compound of Synthesis Example 31 60 | a-1 25 | c-5(A) 5 | d-17(A) 10 | — | VI-9 3 | 4600 | 20800 | 1.373 |
| Example 44 | Compound of Synthesis Example 31 60 Compound of | a-1 25 | c-5(A) 5 | d-20(A) 10 | — | VI-9 3 | 4900 | 30000 | 1.374 |

TABLE 4-1-continued

| | Active energy ray-curable resin composition | | | | | | | | |
|---|---|---|---|---|---|---|---|---|---|
| | I (parts) | II (parts) | III (parts) | IV (parts) | V (parts) | VI (parts) | Viscosity (cps/25° C.) | $\log(I_0/I)$ (dB/Km) | Refractive index $n_D^{25}$ |
| Example 45 | Compound of Synthesis Example 32 60 | a-1 25 | c-5(A) 5 | d-17(A) 10 | — | VI-9 3 | 5300 | 20500 | 1.373 |
| Example 46 | Compound of Synthesis Example 33 60 | a-1 25 | c-5(A) 5 | d-17(A) 10 | — | VI-9 3 | 4600 | 22000 | 1.374 |
| Example 47 | Compound of Synthesis Example 35 60 | a-1 25 | c-5(A) 5 | d-17(A) 10 | — | VI-9 3 | 4200 | 23900 | 1.374 |
| Example 48 | Compound of Synthesis Example 37 60 | a-1 25 | c-5(A) 5 | d-17(A) 10 | — | VI-9 3 | 4100 | 25000 | 1.373 |
| Example 49 | Compound of Synthesis Example 38 60 | a-1 25 | c-5(A) 5 | d-17(A) 10 | — | VI-9 3 | 5700 | 31000 | 1.375 |
| Example 50 | Compound of Synthesis Example 40 60 | a-1 25 | c-5(A) 5 | d-17(A) 10 | — | VI-9 3 | 330 | 18800 | 1.372 |
| Example 51 | Compound of Synthesis Example 42 60 | a-1 25 | c-5(A) 5 | d-17(A) 10 | — | VI-9 3 | 6200 | 19900 | 1.432 |
| Example 52 | Compound of Synthesis Example 65 70 | a-1 20 | c-4(A) 2 c-5(A) 3 | d-9(A) 5 | — | VI-9 0.2 | 4200 | 18600 | 1.370 |
| Example 53 | Compound of Synthesis Example 71 70 | a-1 20 | c-4(A) 2 c-5(A) 3 | d-9(A) 5 | — | VI-9 0.2 | 87000 | 25600 | 1.370 |
| Example 54 | Compound of Synthesis Example 72 60 | a-1 25 | c-5(A) 5 | d-17(A) 10 | — | VI-9 3 | 5900 | 16000 | 1.373 |
| Example 55 | Compound of Synthesis Example 74 60 | a-1 25 | c-5(A) 5 | d-17(A) 10 | — | VI-9 3 | 4800 | 21600 | 1.380 |
| Example 56 | Compound of Synthesis Example 75 60 | a-1 25 | c-5(A) 5 | d-17(A) 10 | — | VI-9 3 | 1420 | 18200 | 1.376 |
| Example 57 | Compound of Synthesis Example 78 60 | a-1 25 | c-5(A) 5 | d-17(A) 10 | — | VI-9 3 | 7100 | 38000 | 1.376 |
| Example 58 | Reaction product of Synthesis Example 60 90 | | | d-17(A) 10 | — | VI-10 0.2 | 6100 | 18900 | 1.384 |
| Example 59 | Reaction product of Synthesis Example 75 90 | | | d-9(A) 10 | — | VI-10 0.2 | 3200 | 18100 | 1.382 |
| Comparative Example 1 | Compound of Synthesis Example 1 60 | — | — | d-9(A) 40 | — | VI-9 3 | 10000 | $>10^5$ | measurement impossible (whitened) |
| Comparative Example 2 | Compound of Synthesis Example 2 60 | — | — | d-17(A) 40 | — | VI-9 3 | 16000 | $>10^5$ | measurement impossible (whitened) |
| Comparative Example 3 | Compound of Synthesis Synthesis Example 1 60 | a-1 25 | c-5(A) 5 | d-17(A) 10 | — | VI-9 3 | Comparative 9700 | 78000 | measurement impossible (whitened) |
| Comparative Example 4 | Compound of Comparative Synthesis Example 2 60 | a-1 25 | c-5(A) 5 | d-17(A) 10 | — | VI-9 3 | 4200 | $>10^5$ | measurement impossible (whitened) |

TABLE 4-1-continued

| | Active energy ray-curable resin composition | | | | | | | | Refractive |
|---|---|---|---|---|---|---|---|---|---|
| | I (parts) | II (parts) | III (parts) | IV (parts) | V (parts) | VI (parts) | Viscosity (cps/25° C.) | log($I_o$/I) (dB/Km) | index $n_D^{25}$ |
| Comparative Example 5 | Compound of Synthesis Example 48 | a-1 | c-5(A) | d-9(A) | — | VI-9 | 8400 | 49000 | measurement impossible (whitened) |
| | 40 | 52 | 4 | 4 | | 3 | | | |
| Comparative Example 6 | Compound of Comparative Synthesis Example 3 | a-1 | c-5(A) | d-9(A) | — | VI-9 | 7700 | >$10^5$ | measurement impossible (whitened) |
| | 40 | 52 | 4 | 4 | | 3 | | | |
| Comparative Example 7 | Compound of Comparative Synthesis Example 4 | a-1 | c-5(A) | d-17(A) | — | VI-9 | 5500 | >$10^5$ | measurement impossible (whitened) |
| | 60 | 25 | 5 | 10 | | 3 | | | |
| Comparative Example 8 | Compound of Comparative Synthesis Example 5 | a-1 | c-5(A) | d-17(A) | — | VI-9 | 4100 | >$10^5$ | measurement impossible (whitened) |
| | 60 | 25 | 5 | 10 | | 3 | | | |
| Comparative Example 9 | Compound of Synthesis Example 6 | a-1 | c-5(A) 4 c-4(A) | d-9(A) | — | VI-9 | 3000 | >$10^5$ | measurement impossible (whitened) |
| | 50 | 40 | 2 | 4 | | 3 | | | |
| Comparative Example 10 | — | a-1 75 | c-5(A) 15 | d-17(A) 10 | — | VI-9 3 | 26 | 12000 | 1.388 |
| Comparative Example 11 | — | a-31 | — | d-17(A) | trimethylol propane tris(3-mercapto propionate) | VI-9 | 33 | >$10^5$ | measurement impossible (whitened) |
| | | 75.6 | | 11.7 | 5.8 | 6.9 | | | |
| Comparative Example 12 | — | a-35 | — | d-17(A) | γ-mercapto-propyl trimethoxysilane | VI-9 | 43 | >$10^5$ | measurement impossible (whitened) |
| | | 75.6 | | 11.7 | 5.8 | 7.0 | | | |
| Comparative Example 13 | — | a-35 | — | d-17(A) | γ-mercapto-propyl trimethoxysilane | VI-9 | 44 | >$10^5$ | measurement impossible (whitened) |
| | | 72.1 | | 23.3 | 3.3 | 0.9 | | | |

(*) fluorine-type surfactant produced by Dainippon Ink and Chemicals, Inc.

TABLE 4-2

| | Adhesiveness | | | Optical transmission fiber | | |
|---|---|---|---|---|---|---|
| | Polymethyl methacrylate plate | Polystyrene plate | Glass plate | Type | Transmission loss (dB/Km) | Mandrel test |
| Example 1 | 10 | 10 | 10 | PM | 1160 | 3 |
| | | | | G | 8 | 3 |
| Example 2 | 10 | 10 | 8 | PM | 1040 | 3 |
| | | | | G | 7 | 3 |
| Example 3 | 8 | 8 | 8 | PM | 1024 | 3 |
| | | | | PS | 1280 | 3 |
| | | | | G | 8 | 2 |
| Example 4 | 10 | 8 | 8 | PM | 1260 | 3 |
| | | | | G | 10 | 2 |
| Example 5 | 10 | 10 | 8 | PM | 1100 | 3 |
| | | | | G | 8 | 3 |
| Example 6 | 10 | 10 | 10 | PM | 1020 | 3 |
| | | | | G | 7 | 3 |
| Example 7 | 10 | 10 | 10 | PM | 1140 | 3 |
| | | | | PS | 1240 | 3 |
| | | | | G | 10 | 3 |
| Example 8 | 10 | 10 | 10 | PM | 1020 | 3 |
| | | | | PS | 1140 | 3 |

TABLE 4-2-continued

| | Adhesiveness | | | Optical transmission fiber | | |
| --- | --- | --- | --- | --- | --- | --- |
| | Polymethyl methacrylate plate | Polystyrene plate | Glass plate | Type | Transmission loss (dB/Km) | Mandrel test |
| Example 9 | 8 | 8 | 8 | G<br>PM<br>PS | 8<br>1780<br>1870 | 3<br>2<br>2 |
| Example 10 | 8 | 8 | 8 | G<br>PM<br>PS | 17<br>2070<br>2460 | 2<br>2<br>2 |
| Example 11 | 10 | 10 | 8 | G<br>PM<br>PS | 25<br>1000<br>1080 | 2<br>3<br>3 |
| Example 12 | 10 | 10 | 10 | G<br>PM<br>PS | 10<br>1020<br>1160 | 3<br>3<br>3 |
| Example 13 | 10 | 10 | 10 | G<br>PM<br>PS | 10<br>930<br>1000 | 3<br>3<br>3 |
| Example 14 | 10 | 10 | 10 | G<br>PM<br>PS | 4<br>920<br>1010 | 3<br>3<br>3 |
| Example 15 | 10 | 10 | 10 | G<br>PM<br>PS | 4<br>1000<br>1050 | 3<br>3<br>3 |
| Example 16 | 10 | 10 | 8 | G<br>PM<br>PS | 7<br>990<br>1120 | 3<br>3<br>3 |
| Example 17 | 10 | 10 | 8 | G<br>PM<br>PS | 9<br>1030<br>1220 | 3<br>3<br>3 |
| Example 18 | 10 | 10 | 10 | G<br>PM<br>PS | 8<br>1000<br>1200 | 3<br>3<br>3 |
| Example 19 | 8 | 8 | 8 | G<br>PM<br>PS | 7<br>1200<br>1420 | 3<br>3<br>3 |
| Example 20 | 10 | 10 | 8 | G<br>PM<br>PS | 37<br>970<br>1070 | 3<br>3<br>3 |
| Example 21 | 8 | 8 | 8 | G<br>PM<br>PS | 11<br>1100<br>1330 | 3<br>3<br>3 |
| Example 22 | 10 | 10 | 10 | G<br>PM<br>PS | 20<br>1140<br>1270 | 2<br>3<br>3 |
| Example 23 | 10 | 10 | 10 | G<br>PM<br>PS | 15<br>980<br>1010 | 3<br>3<br>3 |
| Example 24 | 10 | 10 | 10 | G<br>PM<br>PS | 4<br>1000<br>1110 | 3<br>3<br>3 |
| Example 25 | 8 | 8 | 8 | G<br>PM<br>PS | 6<br>1320<br>1560 | 3<br>2<br>2 |
| Example 26 | 10 | 10 | 10 | G<br>PM<br>PS | 40<br>1020<br>1110 | 2<br>3<br>3 |
| Example 27 | 10 | 10 | 10 | G<br>PM<br>PS | 5<br>1460<br>1700 | 3<br>3<br>3 |
| Example 28 | 10 | 10 | 10 | G<br>PM<br>PS | 44<br>920<br>980 | 3<br>3<br>3 |
| Example 29 | 10 | 10 | 10 | G<br>PM<br>PS | 4<br>900<br>980 | 3<br>3<br>3 |
| Example 30 | 10 | 10 | 10 | G<br>PM<br>PS | 4<br>1150<br>1150 | 3<br>3<br>3 |
| Example 31 | 10 | 10 | 10 | G<br>PM<br>PS | 10<br>1160<br>1240 | 3<br>3<br>3 |
| Example 32 | 10 | 10 | 10 | G<br>PM<br>PS | 6<br>1010<br>1130 | 3<br>3<br>3 |
| Example 33 | 10 | 10 | 8 | G<br>PM<br>PS | 5<br>1290<br>1430 | 3<br>3<br>3 |
| Example 34 | 10 | 10 | 10 | G<br>PM<br>PS | 10<br>1310<br>1400 | 2<br>3<br>3 |

TABLE 4-2-continued

| | Adhesiveness | | | Optical transmission fiber | | |
|---|---|---|---|---|---|---|
| | Polymethyl methacrylate plate | Polystyrene plate | Glass plate | Type | Transmission loss (dB/Km) | Mandrel test |
| | | | | G | 7 | 3 |
| Example 35 | 10 | 10 | 10 | PM | 1320 | 3 |
| | | | | PS | 1440 | 3 |
| | | | | G | 15 | 3 |
| Example 36 | 10 | 10 | 10 | PM | 1360 | 3 |
| | | | | PS | | |
| | | | | G | 10 | 2 |
| Example 37 | 10 | 10 | 10 | PM | 1000 | 3 |
| | | | | PS | 1100 | 3 |
| | | | | G | 7 | 3 |
| Example 38 | 10 | 10 | 10 | PM | 940 | 3 |
| | | | | PS | 990 | 3 |
| | | | | G | 5 | 3 |
| Example 39 | 10 | 10 | 10 | PM | 980 | 3 |
| | | | | PS | 1010 | 3 |
| | | | | G | 4 | 3 |
| Example 40 | 10 | 10 | 10 | PM | 1100 | 3 |
| | | | | PS | 1150 | 3 |
| | | | | G | 8 | 3 |
| Example 41 | 10 | 8 | 8 | PM | 1120 | 3 |
| | | | | PS | 1290 | 3 |
| | | | | G | 8 | 2 |
| Example 42 | 10 | 10 | 8 | PM | 1100 | 3 |
| | | | | PS | 1120 | 3 |
| | | | | G | 7 | 2 |
| Example 43 | 10 | 10 | 10 | PM | 1050 | 3 |
| | | | | PS | 1090 | 3 |
| | | | | G | 7 | 3 |
| Example 44 | 8 | 8 | 8 | PM | 1430 | 3 |
| | | | | PS | 1500 | 3 |
| | | | | G | 37 | 3 |
| Example 45 | 10 | 10 | 10 | PM | 990 | 3 |
| | | | | PS | 1000 | 3 |
| | | | | G | 5 | 3 |
| Example 46 | 10 | 10 | 10 | PM | 1090 | 3 |
| | | | | PS | 1170 | 3 |
| | | | | G | 8 | 3 |
| Example 47 | 10 | 10 | 8 | PM | 1200 | 3 |
| | | | | PS | 1370 | 3 |
| | | | | G | 10 | 2 |
| Example 48 | 10 | 10 | 8 | PM | 1370 | 3 |
| | | | | PS | 1410 | 3 |
| | | | | G | 13 | 2 |
| Example 49 | 10 | 8 | 8 | PM | 1560 | 3 |
| | | | | PS | 1770 | 2 |
| | | | | G | 43 | 2 |
| Example 50 | 10 | 10 | 10 | PM | 930 | 3 |
| | | | | PS | 990 | 3 |
| | | | | G | 4 | 3 |
| Example 51 | 10 | 10 | 10 | PM | 970 | 3 |
| | | | | PS | 1020 | 3 |
| | | | | G | 4 | 3 |
| Example 52 | 10 | 10 | 10 | PM | 900 | 3 |
| | | | | PS | 930 | 3 |
| | | | | G | 4 | 3 |
| Example 53 | 10 | 10 | 8 | PM | 1340 | 3 |
| | | | | PS | 1470 | 3 |
| | | | | G | 13 | 2 |
| Example 54 | 10 | 10 | 10 | PM | 880 | 3 |
| | | | | PS | 910 | 3 |
| | | | | G | 4 | 3 |
| Example 55 | 10 | 10 | 10 | PM | 1010 | 3 |
| | | | | PS | 1110 | 3 |
| | | | | G | 7 | 3 |
| Example 56 | 10 | 10 | 10 | PM | 880 | 3 |
| | | | | PS | 920 | 3 |
| | | | | G | 4 | 3 |
| Example 57 | 8 | 8 | 8 | PM | 4000 | 2 |
| | | | | PS | 4400 | 2 |
| | | | | G | 78 | 2 |
| Example 58 | 10 | 10 | 10 | PM | 910 | 3 |
| | | | | PS | 970 | 3 |
| | | | | G | 5 | 3 |
| Example 59 | 10 | 10 | 10 | PM | 890 | 3 |
| | | | | PS | 900 | 3 |
| | | | | G | 4 | 3 |
| Comparative Example 1 | 4 | 4 | 2 | PM | >5000 | 1 |
| | | | | PS | >5000 | 1 |

TABLE 4-2-continued

| | Adhesiveness | | | Optical transmission fiber | | |
|---|---|---|---|---|---|---|
| | Polymethyl methacrylate plate | Polystyrene plate | Glass plate | Type | Transmission loss (dB/Km) | Mandrel test |
| Comparative Example 2 | 2 | 2 | 2 | G | >5000 | 1 |
| | | | | PM | >5000 | 1 |
| | | | | PS | >5000 | 1 |
| Comparative Example 3 | 2 | 2 | 2 | G | >5000 | 1 |
| | | | | PM | >5000 | 1 |
| | | | | PS | >5000 | 1 |
| Comparative Example 4 | 2 | 2 | 2 | G | >5000 | 1 |
| | | | | PM | >5000 | 1 |
| | | | | PS | >5000 | 1 |
| Comparative Example 5 | 2 | 2 | 2 | G | >5000 | 1 |
| | | | | PM | 4000 | 1 |
| | | | | PS | 4100 | 1 |
| Comparative Example 6 | 4 | 2 | 2 | G | 113 | 1 |
| | | | | PM | >5000 | 1 |
| | | | | PS | >5000 | 1 |
| Comparative Example 7 | 2 | 2 | 2 | G | >5000 | 1 |
| | | | | PM | >5000 | 1 |
| | | | | PS | >5000 | 1 |
| Comparative Example 8 | 2 | 2 | 2 | G | >5000 | 1 |
| | | | | PM | >5000 | 1 |
| | | | | PS | >5000 | 1 |
| Comparative Example 9 | 2 | 2 | 2 | G | >5000 | 1 |
| | | | | PM | >5000 | 1 |
| | | | | PS | >5000 | 1 |
| Comparative Example 10 | 2 | 2 | 2 | G | >5000 | 1 |
| | | | | PM | >5000 | 1 |
| | | | | PS | >5000 | 1 |
| Comparative Example 11 | 2 | 2 | 2 | G | >5000 | 1 |
| | | | | PM | >5000 | 1 |
| | | | | PS | >5000 | 1 |
| Comparative Example 12 | 2 | 2 | 2 | G | 440 | 1 |
| | | | | PM | >5000 | 1 |
| | | | | PS | >5000 | 1 |
| Comparative Example 13 | 2 | 2 | 2 | G | 880 | 1 |
| | | | | PM | >5000 | 1 |
| | | | | PS | >5000 | 1 |
| | | | | G | 930 | 1 |

TABLE 5

| Comparative Example | Cladding material | Refractive index $n_D^{25}$ | Adhesiveness | | | Optical transmission fiber | | |
|---|---|---|---|---|---|---|---|---|
| | | | Polymethyl methacrylate plate | Polystyrene plate | Glass plate | Type | Transmission loss (dB/Km) | Mandrel test |
| 14 | tetrafluoroethylene/ hexafluoropropylene copolymer (melting temperature 325° C.) | 1.345 | 4 | 4 | 2 | PM | 2640 | 1 |
| | | | | | | PS | 3880 | 1 |
| | | | | | | G | 88 | 1 |
| 15 | bulk-polymerized product of a-22 (melting temperature 130° C.) | 1.392 | 6 | 4 | 0 | PM | 2480 | 1 |
| | | | | | | PS | 2920 | 1 |
| | | | | | | G | 75 | 1 |
| 16 | Thermosetting silicone resin | 1.401 | 4 | 4 | 0 | PM | 3480 | 1 |
| | | | | | | PS | 3800 | 1 |
| | | | | | | G | 10 | 1 |

What is claimed is:

1. An optical fiber formed by the process comprising: coating an optical fiber core with an active energy ray-curable resin composition which gives a cured product having a refractive index of not more than 1.44, said composition comprising (I) a fluorine-containing polymer composed of (A) a fluorine-containing (meth)acrylate, and at least one of (B) an alpha,beta-ethylenically unsaturated dicarboxylic acid ester and (C) a non-fluorine-containing mono(meth)acrylate, and having a fluorine atom content of at least 30% by weight, (II) a fluorine-containing (meth)acrylate, (III) a non-fluorine-containing mono(meth)acrylate and (IV) a polyfunctional monomer containing at least two (meth)acryloyl groups in the molecule; and thereafter irradiating active energy rays onto the coating to cure it.

2. The optical fiber of claim 1, wherein the fluorine-containing (meth)acrylate (A) and the fluorine-containing (meth)acrylate (II) are compounds represented by the general formula:

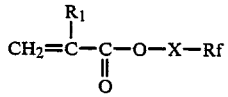

wherein RF represents a fluorinated aliphatic group having 1 to 20 carbon atoms, X represents a divalent linking group, and $R_1$ represents H, $CH_3$, Cl or F.

3. The optical fiber of claim 2, wherein X is $-(CH_2)_m-$ where m is 0 or an integer of 1 to 6.

4. The optical fiber of claim 1, 2 or 3, wherein the fluorine-containing polymer (I) is composed of (A) and (B) or (A) and (B) and (C) wherein the alpha,beta-ethylenically unsaturated dicarboxylic acid ester (B) is a compound represented by the general formula:

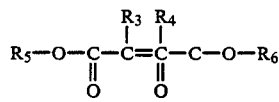

wherein $R_3$ and $R_4$ are identical or different and each represents H, F, Cl or $CH_3$, and $R_5$ and $R_6$ each represent H or an alkyl or fluoroalkyl group having 1 to 20 carbon atoms, and $R_5$ and $R_6$ are identical or different, and when either one of them is H, the other is other than H.

5. The optical fiber of claim 4, wherein $R_5$ and $R_6$ are alkyl groups having 3 to 8 carbon atoms.

6. The optical fiber of any one of claims 1 to 3, wherein the fluorine-containing polymer (I) is composed of (A) and (C) or (A) and (B) and (C) wherein the mono(meth)acrylate (C) and the mono(meth)acrylate (III) are mono(meth)acrylate compounds having a substituent with 3 to 12 carbon atoms at the ester moiety.

7. The optical fiber of claim 6, wherein the substituent in the ester moiety of the mono(meth) acrylate (C) and the mono(meth)acrylate (III) has a cyclic structure.

8. The optical fiber of claim 7, wherein the mono(meth)acrylate (C) and/or the mono(meth)acrylate (III) is isobornyl (meth)acrylate.

9. The optical fiber of claim 7, wherein the mono(meth)acrylate (C) and/or the mono(meth)acrylate (III) is dicyclopentenyl (meth)acrylate.

10. The optical fiber of claim 7, wherein the mono(meth)acrylate (C) and/or the mono(meth)acrylate (III) is a combination of isobornyl (meth)acrylate and dicyclopentenyl (meth)acrylate.

11. The optical fiber of claim 7, wherein the mono(meth)acrylate (C) and/or the mono(meth)acrylate (III) is dicyclopentanyl (meth)acrylate.

12. The optical fiber of claim 7, wherein the mono(meth)acrylate (C) and/or the mono(meth)acrylate (III) is a combination of dicyclopentanyl (meth)acrylate and dicyclopentenyl (meth)acrylate.

13. The optical fiber of any one of claims 1 to 3, wherein the polyfunctional monomer (IV) is a compound having a methyl group in the molecule.

* * * * *